United States Patent
Joshi

(12) 
(10) Patent No.: US 12,238,087 B2
(45) Date of Patent: Feb. 25, 2025

(54) VALIDATING CREDENTIAL KEYS BASED ON COMBINATIONS OF CREDENTIAL VALUE STRINGS AND INPUT ORDER STRINGS

(71) Applicant: GLOBUS MEDICAL, INC., Audubon, PA (US)

(72) Inventor: Sanjay M. Joshi, Andover, MA (US)

(73) Assignee: Globus Medical, Inc., Audubon, PA (US)

( * ) Notice: Subject to any disclaimer, the term of this patent is extended or adjusted under 35 U.S.C. 154(b) by 166 days.

(21) Appl. No.: 17/729,526

(22) Filed: Apr. 26, 2022

(65) Prior Publication Data

US 2023/0109497 A1 Apr. 6, 2023

Related U.S. Application Data

(63) Continuation-in-part of application No. 17/492,811, filed on Oct. 4, 2021.

(51) Int. Cl.
*H04L 9/32* (2006.01)
*G06F 21/31* (2013.01)
*H04L 9/40* (2022.01)

(52) U.S. Cl.
CPC ............ *H04L 63/083* (2013.01); *H04L 63/10* (2013.01)

(58) Field of Classification Search
None
See application file for complete search history.

(56) References Cited

U.S. PATENT DOCUMENTS

| | | |
|---|---|---|
| 4,150,293 A | 4/1979 | Franke |
| 5,246,010 A | 9/1993 | Gazzara et al. |
| 5,354,314 A | 10/1994 | Hardy et al. |
| 5,397,323 A | 3/1995 | Taylor et al. |
| 5,598,453 A | 1/1997 | Baba et al. |
| 5,772,594 A | 6/1998 | Barrick |
| 5,791,908 A | 8/1998 | Gillio |
| 5,820,559 A | 10/1998 | Ng et al. |
| 5,825,982 A | 10/1998 | Wright et al. |
| 5,887,121 A | 3/1999 | Funda et al. |
| 5,911,449 A | 6/1999 | Daniele et al. |
| 5,951,475 A | 9/1999 | Gueziec et al. |
| 5,987,960 A | 11/1999 | Messner et al. |
| 6,012,216 A | 1/2000 | Esteves et al. |
| 6,031,888 A | 2/2000 | Ivan et al. |
| 6,033,415 A | 3/2000 | Mittelstadt et al. |
| 6,080,181 A | 6/2000 | Jensen et al. |

(Continued)

OTHER PUBLICATIONS

US 8,231,638 B2, 07/2012, Swarup et al. (withdrawn)

*Primary Examiner* — Christopher B Robinson

(57) ABSTRACT

An electronic device includes at least one processor and at least one memory storing instructions executable by the at least one processor. The at least one processor operates to obtain a credential value string indicating a sequence of credential values entered by a user through a user interface as a part of a credential key. The at least one processor operates to obtain an input order string indicating an order in which individual ones of the sequence of credential values were separately entered by the user through the user interface as another part of the credential key. The at least one processor operates to validate the credential key based on the credential value string and based on the input order string.

20 Claims, 9 Drawing Sheets

(56) References Cited

U.S. PATENT DOCUMENTS

| | | |
|---|---|---|
| 6,106,511 A | 8/2000 | Jensen |
| 6,122,541 A | 9/2000 | Cosman et al. |
| 6,144,875 A | 11/2000 | Schweikard et al. |
| 6,157,853 A | 12/2000 | Blume et al. |
| 6,167,145 A | 12/2000 | Foley et al. |
| 6,167,292 A | 12/2000 | Badano et al. |
| 6,201,984 B1 | 3/2001 | Funda et al. |
| 6,203,196 B1 | 3/2001 | Meyer et al. |
| 6,205,411 B1 | 3/2001 | DiGioia, III et al. |
| 6,212,419 B1 | 4/2001 | Blume et al. |
| 6,231,565 B1 | 5/2001 | Tovey et al. |
| 6,236,875 B1 | 5/2001 | Bucholz et al. |
| 6,246,900 B1 | 6/2001 | Cosman et al. |
| 6,301,495 B1 | 10/2001 | Gueziec et al. |
| 6,306,126 B1 | 10/2001 | Montezuma |
| 6,312,435 B1 | 11/2001 | Wallace et al. |
| 6,314,311 B1 | 11/2001 | Williams et al. |
| 6,320,929 B1 | 11/2001 | Von Der Haar |
| 6,322,567 B1 | 11/2001 | Mittelstadt et al. |
| 6,325,808 B1 | 12/2001 | Bernard et al. |
| 6,340,363 B1 | 1/2002 | Bolger et al. |
| 6,377,011 B1 | 4/2002 | Ben-Ur |
| 6,379,302 B1 | 4/2002 | Kessman et al. |
| 6,402,762 B2 | 6/2002 | Hunter et al. |
| 6,424,885 B1 | 7/2002 | Niemeyer et al. |
| 6,447,503 B1 | 9/2002 | Wynne et al. |
| 6,451,027 B1 | 9/2002 | Cooper et al. |
| 6,477,400 B1 | 11/2002 | Barrick |
| 6,484,049 B1 | 11/2002 | Seeley et al. |
| 6,487,267 B1 | 11/2002 | Wolter |
| 6,490,467 B1 | 12/2002 | Bucholz et al. |
| 6,490,475 B1 | 12/2002 | Seeley et al. |
| 6,499,488 B1 | 12/2002 | Hunter et al. |
| 6,501,981 B1 | 12/2002 | Schweikard et al. |
| 6,507,751 B2 | 1/2003 | Blume et al. |
| 6,535,756 B1 | 3/2003 | Simon et al. |
| 6,560,354 B1 | 5/2003 | Maurer, Jr. et al. |
| 6,565,554 B1 | 5/2003 | Niemeyer |
| 6,587,750 B2 | 7/2003 | Gerbi et al. |
| 6,614,453 B1 | 9/2003 | Suri et al. |
| 6,614,871 B1 | 9/2003 | Kobiki et al. |
| 6,619,840 B2 | 9/2003 | Rasche et al. |
| 6,636,757 B1 | 10/2003 | Jascob et al. |
| 6,645,196 B1 | 11/2003 | Nixon et al. |
| 6,666,579 B2 | 12/2003 | Jensen |
| 6,669,635 B2 | 12/2003 | Kessman et al. |
| 6,701,173 B2 | 3/2004 | Nowinski et al. |
| 6,757,068 B2 | 6/2004 | Foxlin |
| 6,782,287 B2 | 8/2004 | Grzeszczuk et al. |
| 6,783,524 B2 | 8/2004 | Anderson et al. |
| 6,786,896 B1 | 9/2004 | Madhani et al. |
| 6,788,018 B1 | 9/2004 | Blumenkranz |
| 6,804,581 B2 | 10/2004 | Wang et al. |
| 6,823,207 B1 | 11/2004 | Jensen et al. |
| 6,827,351 B2 | 12/2004 | Graziani et al. |
| 6,837,892 B2 | 1/2005 | Shoham |
| 6,839,612 B2 | 1/2005 | Sanchez et al. |
| 6,856,826 B2 | 2/2005 | Seeley et al. |
| 6,856,827 B2 | 2/2005 | Seeley et al. |
| 6,879,880 B2 | 4/2005 | Nowlin et al. |
| 6,892,090 B2 | 5/2005 | Verard et al. |
| 6,920,347 B2 | 7/2005 | Simon et al. |
| 6,922,632 B2 | 7/2005 | Foxlin |
| 6,968,224 B2 | 11/2005 | Kessman et al. |
| 6,978,166 B2 | 12/2005 | Foley et al. |
| 6,988,009 B2 | 1/2006 | Grimm et al. |
| 6,991,627 B2 | 1/2006 | Madhani et al. |
| 6,996,487 B2 | 2/2006 | Jutras et al. |
| 6,999,852 B2 | 2/2006 | Green |
| 7,007,699 B2 | 3/2006 | Martinelli et al. |
| 7,016,457 B1 | 3/2006 | Senzig et al. |
| 7,043,961 B2 | 5/2006 | Pandey et al. |
| 7,062,006 B1 | 6/2006 | Pelc et al. |
| 7,063,705 B2 | 6/2006 | Young et al. |
| 7,072,707 B2 | 7/2006 | Galloway, Jr. et al. |
| 7,083,615 B2 | 8/2006 | Peterson et al. |
| 7,097,640 B2 | 8/2006 | Wang et al. |
| 7,099,428 B2 | 8/2006 | Clinthorne et al. |
| 7,108,421 B2 | 9/2006 | Gregerson et al. |
| 7,130,676 B2 | 10/2006 | Barrick |
| 7,139,418 B2 | 11/2006 | Abovitz et al. |
| 7,139,601 B2 | 11/2006 | Bucholz et al. |
| 7,155,316 B2 | 12/2006 | Sutherland et al. |
| 7,164,968 B2 | 1/2007 | Treat et al. |
| 7,167,738 B2 | 1/2007 | Schweikard et al. |
| 7,169,141 B2 | 1/2007 | Brock et al. |
| 7,172,627 B2 | 2/2007 | Fiere et al. |
| 7,194,120 B2 | 3/2007 | Wicker et al. |
| 7,197,107 B2 | 3/2007 | Arai et al. |
| 7,231,014 B2 | 6/2007 | Levy |
| 7,231,063 B2 | 6/2007 | Naimark et al. |
| 7,239,940 B2 | 7/2007 | Wang et al. |
| 7,248,914 B2 | 7/2007 | Hastings et al. |
| 7,301,648 B2 | 11/2007 | Foxlin |
| 7,302,288 B1 | 11/2007 | Schellenberg |
| 7,313,430 B2 | 12/2007 | Urquhart et al. |
| 7,318,805 B2 | 1/2008 | Schweikard et al. |
| 7,318,827 B2 | 1/2008 | Leitner et al. |
| 7,319,897 B2 | 1/2008 | Leitner et al. |
| 7,324,623 B2 | 1/2008 | Heuscher et al. |
| 7,327,865 B2 | 2/2008 | Fu et al. |
| 7,331,967 B2 | 2/2008 | Lee et al. |
| 7,333,642 B2 | 2/2008 | Green |
| 7,339,341 B2 | 3/2008 | Oleynikov et al. |
| 7,366,562 B2 | 4/2008 | Dukesherer et al. |
| 7,379,790 B2 | 5/2008 | Toth et al. |
| 7,386,365 B2 | 6/2008 | Nixon |
| 7,422,592 B2 | 9/2008 | Morley et al. |
| 7,435,216 B2 | 10/2008 | Kwon et al. |
| 7,440,793 B2 | 10/2008 | Chauhan et al. |
| 7,460,637 B2 | 12/2008 | Clinthorne et al. |
| 7,466,303 B2 | 12/2008 | Yi et al. |
| 7,493,153 B2 | 2/2009 | Ahmed et al. |
| 7,505,617 B2 | 3/2009 | Fu et al. |
| 7,533,892 B2 | 5/2009 | Schena et al. |
| 7,542,791 B2 | 6/2009 | Mire et al. |
| 7,555,331 B2 | 6/2009 | Viswanathan |
| 7,567,834 B2 | 7/2009 | Clayton et al. |
| 7,594,912 B2 | 9/2009 | Cooper et al. |
| 7,606,613 B2 | 10/2009 | Simon et al. |
| 7,607,440 B2 | 10/2009 | Coste-Maniere et al. |
| 7,623,902 B2 | 11/2009 | Pacheco |
| 7,630,752 B2 | 12/2009 | Viswanathan |
| 7,630,753 B2 | 12/2009 | Simon et al. |
| 7,643,862 B2 | 1/2010 | Schoenefeld |
| 7,660,623 B2 | 2/2010 | Hunter et al. |
| 7,661,881 B2 | 2/2010 | Gregerson et al. |
| 7,683,331 B2 | 3/2010 | Chang |
| 7,683,332 B2 | 3/2010 | Chang |
| 7,689,320 B2 | 3/2010 | Prisco et al. |
| 7,691,098 B2 | 4/2010 | Wallace et al. |
| 7,702,379 B2 | 4/2010 | Avinash et al. |
| 7,702,477 B2 | 4/2010 | Tuemmler et al. |
| 7,711,083 B2 | 5/2010 | Heigl et al. |
| 7,711,406 B2 | 5/2010 | Kuhn et al. |
| 7,720,523 B2 | 5/2010 | Omernick et al. |
| 7,725,253 B2 | 5/2010 | Foxlin |
| 7,726,171 B2 | 6/2010 | Langlotz et al. |
| 7,742,801 B2 | 6/2010 | Neubauer et al. |
| 7,751,865 B2 | 7/2010 | Jascob et al. |
| 7,760,849 B2 | 7/2010 | Zhang |
| 7,762,825 B2 | 7/2010 | Burbank et al. |
| 7,763,015 B2 | 7/2010 | Cooper et al. |
| 7,787,699 B2 | 8/2010 | Mahesh et al. |
| 7,796,728 B2 | 9/2010 | Bergfjord |
| 7,813,838 B2 | 10/2010 | Sommer |
| 7,818,044 B2 | 10/2010 | Dukesherer et al. |
| 7,819,859 B2 | 10/2010 | Prisco et al. |
| 7,824,401 B2 | 11/2010 | Manzo et al. |
| 7,831,294 B2 | 11/2010 | Viswanathan |
| 7,834,484 B2 | 11/2010 | Sartor |
| 7,835,557 B2 | 11/2010 | Kendrick et al. |
| 7,835,778 B2 | 11/2010 | Foley et al. |
| 7,835,784 B2 | 11/2010 | Mire et al. |

(56) References Cited

U.S. PATENT DOCUMENTS

| | | |
|---|---|---|
| 7,840,253 B2 | 11/2010 | Tremblay et al. |
| 7,840,256 B2 | 11/2010 | Lakin et al. |
| 7,843,158 B2 | 11/2010 | Prisco |
| 7,844,320 B2 | 11/2010 | Shahidi |
| 7,853,305 B2 | 12/2010 | Simon et al. |
| 7,853,313 B2 | 12/2010 | Thompson |
| 7,865,269 B2 | 1/2011 | Prisco et al. |
| D631,966 S | 2/2011 | Perloff et al. |
| 7,879,045 B2 | 2/2011 | Gielen et al. |
| 7,881,767 B2 | 2/2011 | Strommer et al. |
| 7,881,770 B2 | 2/2011 | Melkent et al. |
| 7,886,743 B2 | 2/2011 | Cooper et al. |
| RE42,194 E | 3/2011 | Foley et al. |
| RE42,226 E | 3/2011 | Foley et al. |
| 7,900,524 B2 | 3/2011 | Calloway et al. |
| 7,907,166 B2 | 3/2011 | Lamprecht et al. |
| 7,909,122 B2 | 3/2011 | Schena et al. |
| 7,925,653 B2 | 4/2011 | Saptharishi |
| 7,930,065 B2 | 4/2011 | Larkin et al. |
| 7,935,130 B2 | 5/2011 | Williams |
| 7,940,999 B2 | 5/2011 | Liao et al. |
| 7,945,012 B2 | 5/2011 | Ye et al. |
| 7,945,021 B2 | 5/2011 | Shapiro et al. |
| 7,953,470 B2 | 5/2011 | Vetter et al. |
| 7,954,397 B2 | 6/2011 | Choi et al. |
| 7,971,341 B2 | 7/2011 | Dukesherer et al. |
| 7,974,674 B2 | 7/2011 | Hauck et al. |
| 7,974,677 B2 | 7/2011 | Mire et al. |
| 7,974,681 B2 | 7/2011 | Wallace et al. |
| 7,979,157 B2 | 7/2011 | Anvari |
| 7,983,733 B2 | 7/2011 | Viswanathan |
| 7,988,215 B2 | 8/2011 | Seibold |
| 7,996,110 B2 | 8/2011 | Lipow et al. |
| 8,004,121 B2 | 8/2011 | Sartor |
| 8,004,229 B2 | 8/2011 | Nowlin et al. |
| 8,010,177 B2 | 8/2011 | Csavoy et al. |
| 8,019,045 B2 | 9/2011 | Kato |
| 8,021,310 B2 | 9/2011 | Sanborn et al. |
| 8,035,685 B2 | 10/2011 | Jensen |
| 8,046,054 B2 | 10/2011 | Kim et al. |
| 8,046,057 B2 | 10/2011 | Clarke |
| 8,052,688 B2 | 11/2011 | Wolf, II |
| 8,054,184 B2 | 11/2011 | Cline et al. |
| 8,054,752 B2 | 11/2011 | Druke et al. |
| 8,057,397 B2 | 11/2011 | Li et al. |
| 8,057,407 B2 | 11/2011 | Martinelli et al. |
| 8,062,288 B2 | 11/2011 | Cooper et al. |
| 8,062,375 B2 | 11/2011 | Glerum et al. |
| 8,066,524 B2 | 11/2011 | Burbank et al. |
| 8,073,335 B2 | 12/2011 | Labonville et al. |
| 8,079,950 B2 | 12/2011 | Stern et al. |
| 8,086,299 B2 | 12/2011 | Adler et al. |
| 8,092,370 B2 | 1/2012 | Roberts et al. |
| 8,098,914 B2 | 1/2012 | Liao et al. |
| 8,100,950 B2 | 1/2012 | St. Clair et al. |
| 8,105,320 B2 | 1/2012 | Manzo |
| 8,108,025 B2 | 1/2012 | Csavoy et al. |
| 8,109,877 B2 | 2/2012 | Moctezuma de la Barrera et al. |
| 8,112,292 B2 | 2/2012 | Simon |
| 8,116,430 B1 | 2/2012 | Shapiro et al. |
| 8,120,301 B2 | 2/2012 | Goldberg et al. |
| 8,121,249 B2 | 2/2012 | Wang et al. |
| 8,123,675 B2 | 2/2012 | Funda et al. |
| 8,133,229 B1 | 3/2012 | Bonutti |
| 8,142,420 B2 | 3/2012 | Schena |
| 8,147,494 B2 | 4/2012 | Leitner et al. |
| 8,150,494 B2 | 4/2012 | Simon et al. |
| 8,150,497 B2 | 4/2012 | Gielen et al. |
| 8,150,498 B2 | 4/2012 | Gielen et al. |
| 8,165,658 B2 | 4/2012 | Waynik et al. |
| 8,170,313 B2 | 5/2012 | Kendrick et al. |
| 8,179,073 B2 | 5/2012 | Farritor et al. |
| 8,182,476 B2 | 5/2012 | Julian et al. |
| 8,184,880 B2 | 5/2012 | Zhao et al. |
| 8,202,278 B2 | 6/2012 | Orban, III et al. |
| 8,208,708 B2 | 6/2012 | Homan et al. |
| 8,208,988 B2 | 6/2012 | Jenser |
| 8,219,177 B2 | 7/2012 | Smith et al. |
| 8,219,178 B2 | 7/2012 | Smith et al. |
| 8,220,468 B2 | 7/2012 | Cooper et al. |
| 8,224,024 B2 | 7/2012 | Foxlin et al. |
| 8,224,484 B2 | 7/2012 | Swarup et al. |
| 8,225,798 B2 | 7/2012 | Baldwin et al. |
| 8,228,368 B2 | 7/2012 | Zhao et al. |
| 8,231,610 B2 | 7/2012 | Jo et al. |
| 8,263,933 B2 | 7/2012 | Hartmann et al. |
| 8,239,001 B2 | 8/2012 | Verard et al. |
| 8,241,271 B2 | 8/2012 | Millman et al. |
| 8,248,413 B2 | 8/2012 | Gattani et al. |
| 8,256,319 B2 | 9/2012 | Cooper et al. |
| 8,271,069 B2 | 9/2012 | Jascob et al. |
| 8,271,130 B2 | 9/2012 | Hourtash |
| 8,281,670 B2 | 10/2012 | Larkin et al. |
| 8,282,653 B2 | 10/2012 | Nelson et al. |
| 8,301,226 B2 | 10/2012 | Csavoy et al. |
| 8,311,611 B2 | 11/2012 | Csavoy et al. |
| 8,320,991 B2 | 11/2012 | Jascob et al. |
| 8,332,012 B2 | 12/2012 | Kienzle, III |
| 8,333,755 B2 | 12/2012 | Cooper et al. |
| 8,335,552 B2 | 12/2012 | Stiles |
| 8,335,557 B2 | 12/2012 | Maschke |
| 8,348,931 B2 | 1/2013 | Cooper et al. |
| 8,353,963 B2 | 1/2013 | Glerum |
| 8,358,818 B2 | 1/2013 | Miga et al. |
| 8,359,730 B2 | 1/2013 | Burg et al. |
| 8,374,673 B2 | 2/2013 | Adcox et al. |
| 8,374,723 B2 | 2/2013 | Zhao et al. |
| 8,379,791 B2 | 2/2013 | Forthmann et al. |
| 8,381,272 B1* | 2/2013 | Nelson .................. H04L 63/083 713/184 |
| 8,386,019 B2 | 2/2013 | Camus et al. |
| 8,392,022 B2 | 3/2013 | Ortmaier et al. |
| 8,394,099 B2 | 3/2013 | Patwardhan |
| 8,395,342 B2 | 3/2013 | Prisco |
| 8,398,634 B2 | 3/2013 | Manzo et al. |
| 8,400,094 B2 | 3/2013 | Schena |
| 8,414,957 B2 | 4/2013 | Enzerink et al. |
| 8,418,073 B2 | 4/2013 | Mohr et al. |
| 8,450,694 B2 | 5/2013 | Baviera et al. |
| 8,452,447 B2 | 5/2013 | Nixon |
| RE44,305 E | 6/2013 | Foley et al. |
| 8,462,911 B2 | 6/2013 | Vesel et al. |
| 8,465,476 B2 | 6/2013 | Rogers et al. |
| 8,465,771 B2 | 6/2013 | Wan et al. |
| 8,467,851 B2 | 6/2013 | Mire et al. |
| 8,467,852 B2 | 6/2013 | Csavoy et al. |
| 8,469,947 B2 | 6/2013 | Devengenzo et al. |
| RE44,392 E | 7/2013 | Hynes |
| 8,483,434 B2 | 7/2013 | Buehner et al. |
| 8,483,800 B2 | 7/2013 | Jensen et al. |
| 8,486,532 B2 | 7/2013 | Enzerink et al. |
| 8,489,235 B2 | 7/2013 | Moll et al. |
| 8,500,722 B2 | 8/2013 | Cooper |
| 8,500,728 B2 | 8/2013 | Newton et al. |
| 8,504,201 B2 | 8/2013 | Moll et al. |
| 8,506,555 B2 | 8/2013 | Ruiz Morales |
| 8,506,556 B2 | 8/2013 | Schena |
| 8,508,173 B2 | 8/2013 | Goldberg et al. |
| 8,512,318 B2 | 8/2013 | Tovey et al. |
| 8,515,576 B2 | 8/2013 | Lipow et al. |
| 8,518,120 B2 | 8/2013 | Glerum et al. |
| 8,521,331 B2 | 8/2013 | Itkowitz |
| 8,526,688 B2 | 9/2013 | Groszmann et al. |
| 8,526,700 B2 | 9/2013 | Isaacs |
| 8,527,094 B2 | 9/2013 | Kumar et al. |
| 8,528,440 B2 | 9/2013 | Morley et al. |
| 8,532,741 B2 | 9/2013 | Heruth et al. |
| 8,541,970 B2 | 9/2013 | Nowlin et al. |
| 8,548,563 B2 | 10/2013 | Simon et al. |
| 8,549,732 B2 | 10/2013 | Burg et al. |
| 8,551,114 B2 | 10/2013 | Ramos de la Pena |
| 8,551,116 B2 | 10/2013 | Julian et al. |
| 8,556,807 B2 | 10/2013 | Scott et al. |
| 8,556,979 B2 | 10/2013 | Glerum et al. |

(56) References Cited

U.S. PATENT DOCUMENTS

| | | |
|---|---|---|
| 8,560,118 B2 | 10/2013 | Green et al. |
| 8,561,473 B2 | 10/2013 | Blumenkranz |
| 8,562,594 B2 | 10/2013 | Cooper et al. |
| 8,571,638 B2 | 10/2013 | Shoham |
| 8,571,710 B2 | 10/2013 | Coste-Maniere et al. |
| 8,573,465 B2 | 11/2013 | Shelton, IV |
| 8,574,303 B2 | 11/2013 | Sharkey et al. |
| 8,585,420 B2 | 11/2013 | Burbank et al. |
| 8,594,841 B2 | 11/2013 | Zhao et al. |
| 8,597,198 B2 | 12/2013 | Sanborn et al. |
| 8,600,478 B2 | 12/2013 | Verard et al. |
| 8,603,077 B2 | 12/2013 | Cooper et al. |
| 8,611,985 B2 | 12/2013 | Lavallee et al. |
| 8,613,230 B2 | 12/2013 | Blumenkranz et al. |
| 8,621,939 B2 | 1/2014 | Blumenkranz et al. |
| 8,624,537 B2 | 1/2014 | Nowlin et al. |
| 8,630,389 B2 | 1/2014 | Kato |
| 8,634,897 B2 | 1/2014 | Simon et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,639,000 B2 | 1/2014 | Zhao et al. |
| 8,641,726 B2 | 2/2014 | Bonutti |
| 8,644,907 B2 | 2/2014 | Hartmann et al. |
| 8,657,809 B2 | 2/2014 | Schoepp |
| 8,660,635 B2 | 2/2014 | Simon et al. |
| 8,666,544 B2 | 3/2014 | Moll et al. |
| 8,675,939 B2 | 3/2014 | Moctezuma de la Barrera |
| 8,678,647 B2 | 3/2014 | Gregerson et al. |
| 8,679,125 B2 | 3/2014 | Smith et al. |
| 8,679,183 B2 | 3/2014 | Glerum et al. |
| 8,682,413 B2 | 3/2014 | Lloyd |
| 8,684,253 B2 | 4/2014 | Giordano et al. |
| 8,685,098 B2 | 4/2014 | Glerum et al. |
| 8,693,730 B2 | 4/2014 | Umasuthan et al. |
| 8,694,075 B2 | 4/2014 | Groszmann et al. |
| 8,696,458 B2 | 4/2014 | Foxlin et al. |
| 8,700,123 B2 | 4/2014 | Okamura et al. |
| 8,706,086 B2 | 4/2014 | Glerum |
| 8,706,185 B2 | 4/2014 | Foley et al. |
| 8,706,301 B2 | 4/2014 | Zhao et al. |
| 8,717,430 B2 | 5/2014 | Simon et al. |
| 8,727,618 B2 | 5/2014 | Maschke et al. |
| 8,734,432 B2 | 5/2014 | Tuma et al. |
| 8,738,115 B2 | 5/2014 | Amberg et al. |
| 8,738,181 B2 | 5/2014 | Greer et al. |
| 8,740,882 B2 | 6/2014 | Jun et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,761,930 B2 | 6/2014 | Nixon |
| 8,764,448 B2 | 7/2014 | Yang et al. |
| 8,771,170 B2 | 7/2014 | Mesallum et al. |
| 8,781,186 B2 | 7/2014 | Clements et al. |
| 8,781,630 B2 | 7/2014 | Banks et al. |
| 8,784,385 B2 | 7/2014 | Boyden et al. |
| 8,786,241 B2 | 7/2014 | Nowlin et al. |
| 8,787,520 B2 | 7/2014 | Baba |
| 8,792,704 B2 | 7/2014 | Isaacs |
| 8,798,231 B2 | 8/2014 | Notohara et al. |
| 8,800,838 B2 | 8/2014 | Shelton, IV |
| 8,808,164 B2 | 8/2014 | Hoffman et al. |
| 8,812,077 B2 | 8/2014 | Dempsey |
| 8,814,793 B2 | 8/2014 | Brabrand |
| 8,816,628 B2 | 8/2014 | Nowlin et al. |
| 8,818,105 B2 | 8/2014 | Myronenko et al. |
| 8,820,605 B2 | 9/2014 | Shelton, IV |
| 8,821,511 B2 | 9/2014 | Von Jako et al. |
| 8,823,308 B2 | 9/2014 | Nowlin et al. |
| 8,827,996 B2 | 9/2014 | Scott et al. |
| 8,828,024 B2 | 9/2014 | Farritor et al. |
| 8,830,224 B2 | 9/2014 | Zhao et al. |
| 8,834,489 B2 | 9/2014 | Cooper et al. |
| 8,834,490 B2 | 9/2014 | Bonutti |
| 8,838,270 B2 | 9/2014 | Druke et al. |
| 8,844,789 B2 | 9/2014 | Shelton, IV et al. |
| 8,855,822 B2 | 10/2014 | Bartol et al. |
| 8,858,598 B2 | 10/2014 | Seifert et al. |
| 8,860,753 B2 | 10/2014 | Bhandarkar et al. |
| 8,864,751 B2 | 10/2014 | Prisco et al. |
| 8,864,798 B2 | 10/2014 | Weiman et al. |
| 8,864,833 B2 | 10/2014 | Glerum et al. |
| 8,867,703 B2 | 10/2014 | Shapiro et al. |
| 8,870,880 B2 | 10/2014 | Himmelberger et al. |
| 8,876,866 B2 | 11/2014 | Zappacosta et al. |
| 8,880,223 B2 | 11/2014 | Raj et al. |
| 8,882,803 B2 | 11/2014 | Iott et al. |
| 8,883,210 B1 | 11/2014 | Truncale et al. |
| 8,888,821 B2 | 11/2014 | Rezach et al. |
| 8,888,853 B2 | 11/2014 | Glerum et al. |
| 8,888,854 B2 | 11/2014 | Glerum et al. |
| 8,894,652 B2 | 11/2014 | Seifert et al. |
| 8,894,688 B2 | 11/2014 | Suh |
| 8,894,691 B2 | 11/2014 | Iott et al. |
| 8,906,069 B2 | 12/2014 | Hansell et al. |
| 8,964,934 B2 | 2/2015 | Ein-Gal |
| 8,992,580 B2 | 3/2015 | Bar et al. |
| 8,996,169 B2 | 3/2015 | Lightcap et al. |
| 9,001,963 B2 | 4/2015 | Sowards-Emmerd et al. |
| 9,002,076 B2 | 4/2015 | Khadem et al. |
| 9,044,190 B2 | 6/2015 | Rubner et al. |
| 9,107,683 B2 | 8/2015 | Hourtash et al. |
| 9,125,556 B2 | 9/2015 | Zehavi et al. |
| 9,131,986 B2 | 9/2015 | Greer et al. |
| 9,215,968 B2 | 12/2015 | Schostek et al. |
| 9,269,358 B1* | 2/2016 | Saylor .................. G06F 21/46 |
| 9,308,050 B2 | 4/2016 | Kostrzewski et al. |
| 9,380,984 B2 | 7/2016 | Li et al. |
| 9,393,039 B2 | 7/2016 | Lechner et al. |
| 9,398,886 B2 | 7/2016 | Gregerson et al. |
| 9,398,890 B2 | 7/2016 | Dong et al. |
| 9,414,859 B2 | 8/2016 | Ballard et al. |
| 9,420,975 B2 | 8/2016 | Gutfleisch et al. |
| 9,492,235 B2 | 11/2016 | Hourtash et al. |
| 9,592,096 B2 | 3/2017 | Maillet et al. |
| 9,750,465 B2 | 9/2017 | Engel et al. |
| 9,757,203 B2 | 9/2017 | Hourtash et al. |
| 9,795,354 B2 | 10/2017 | Menegaz et al. |
| 9,814,535 B2 | 11/2017 | Bar et al. |
| 9,820,783 B2 | 11/2017 | Donner et al. |
| 9,833,265 B2 | 11/2017 | Donner et al. |
| 9,848,922 B2 | 12/2017 | Tohmeh et al. |
| 9,925,011 B2 | 3/2018 | Gombert et al. |
| 9,931,025 B1 | 4/2018 | Graetzel et al. |
| 10,034,717 B2 | 7/2018 | Miller et al. |
| 2001/0036302 A1 | 11/2001 | Miller |
| 2002/0035321 A1 | 3/2002 | Bucholz et al. |
| 2004/0068172 A1 | 4/2004 | Nowinski et al. |
| 2004/0076259 A1 | 4/2004 | Jensen et al. |
| 2005/0096502 A1 | 5/2005 | Khalili |
| 2005/0143651 A1 | 6/2005 | Verard et al. |
| 2005/0171558 A1 | 8/2005 | Abovitz et al. |
| 2006/0100610 A1 | 5/2006 | Wallace et al. |
| 2006/0173329 A1 | 8/2006 | Marquart et al. |
| 2006/0184396 A1 | 8/2006 | Dennis et al. |
| 2006/0241416 A1 | 10/2006 | Marquart et al. |
| 2006/0291612 A1 | 12/2006 | Nishide et al. |
| 2007/0015987 A1 | 1/2007 | Benlloch Baviera et al. |
| 2007/0021738 A1 | 1/2007 | Hasser et al. |
| 2007/0038059 A1 | 2/2007 | Sheffer et al. |
| 2007/0073133 A1 | 3/2007 | Schoenefeld |
| 2007/0156121 A1 | 7/2007 | Millman et al. |
| 2007/0156157 A1 | 7/2007 | Nahum et al. |
| 2007/0167712 A1 | 7/2007 | Keglovich et al. |
| 2007/0233238 A1 | 10/2007 | Huynh et al. |
| 2008/0004523 A1 | 1/2008 | Jensen |
| 2008/0013809 A1 | 1/2008 | Zhu et al. |
| 2008/0033283 A1 | 2/2008 | Dellaca et al. |
| 2008/0046122 A1 | 2/2008 | Manzo et al. |
| 2008/0082109 A1 | 4/2008 | Moll et al. |
| 2008/0108912 A1 | 5/2008 | Node-Langlois |
| 2008/0108991 A1 | 5/2008 | Von Jako |
| 2008/0109012 A1 | 5/2008 | Falco et al. |
| 2008/0144906 A1 | 6/2008 | Allred et al. |

(56) References Cited

U.S. PATENT DOCUMENTS

| | | |
|---|---|---|
| 2008/0161680 A1 | 7/2008 | Von Jako et al. |
| 2008/0161682 A1 | 7/2008 | Kendrick et al. |
| 2008/0177203 A1 | 7/2008 | von Jako |
| 2008/0214922 A1 | 9/2008 | Hartmann et al. |
| 2008/0228068 A1 | 9/2008 | Viswanathan et al. |
| 2008/0228196 A1 | 9/2008 | Wang et al. |
| 2008/0235052 A1 | 9/2008 | Node-Langlois et al. |
| 2008/0269596 A1 | 10/2008 | Revie et al. |
| 2008/0287771 A1 | 11/2008 | Anderson |
| 2008/0287781 A1 | 11/2008 | Revie et al. |
| 2008/0300477 A1 | 12/2008 | Lloyd et al. |
| 2008/0300478 A1 | 12/2008 | Zuhars et al. |
| 2008/0302950 A1 | 12/2008 | Park et al. |
| 2008/0306490 A1 | 12/2008 | Lakin et al. |
| 2008/0319311 A1 | 12/2008 | Hamadeh |
| 2009/0012509 A1 | 1/2009 | Csavoy et al. |
| 2009/0030428 A1 | 1/2009 | Omori et al. |
| 2009/0080737 A1 | 3/2009 | Battle et al. |
| 2009/0185655 A1 | 7/2009 | Koken et al. |
| 2009/0198121 A1 | 8/2009 | Hoheisel |
| 2009/0216113 A1 | 8/2009 | Meier et al. |
| 2009/0228019 A1 | 9/2009 | Gross et al. |
| 2009/0259123 A1 | 10/2009 | Navab et al. |
| 2009/0259230 A1 | 10/2009 | Khadem et al. |
| 2009/0264899 A1 | 10/2009 | Appenrodt et al. |
| 2009/0281417 A1 | 11/2009 | Hartmann et al. |
| 2010/0022874 A1 | 1/2010 | Wang et al. |
| 2010/0039506 A1 | 2/2010 | Sarvestani et al. |
| 2010/0125286 A1 | 5/2010 | Wang et al. |
| 2010/0130986 A1 | 5/2010 | Mailloux et al. |
| 2010/0228117 A1 | 9/2010 | Hartmann |
| 2010/0228265 A1 | 9/2010 | Prisco |
| 2010/0249571 A1 | 9/2010 | Jensen et al. |
| 2010/0274120 A1 | 10/2010 | Heuscher |
| 2010/0280363 A1 | 11/2010 | Skarda et al. |
| 2010/0331858 A1 | 12/2010 | Simaan et al. |
| 2011/0022229 A1 | 1/2011 | Jang et al. |
| 2011/0077504 A1 | 3/2011 | Fischer et al. |
| 2011/0098553 A1 | 4/2011 | Robbins et al. |
| 2011/0137152 A1 | 6/2011 | Li |
| 2011/0213384 A1 | 9/2011 | Jeong |
| 2011/0224684 A1 | 9/2011 | Larkin et al. |
| 2011/0224685 A1 | 9/2011 | Larkin et al. |
| 2011/0224686 A1 | 9/2011 | Larkin et al. |
| 2011/0224687 A1 | 9/2011 | Larkin et al. |
| 2011/0224688 A1 | 9/2011 | Larkin et al. |
| 2011/0224689 A1 | 9/2011 | Larkin et al. |
| 2011/0224825 A1 | 9/2011 | Larkin et al. |
| 2011/0230967 A1 | 9/2011 | O'Halloran et al. |
| 2011/0238080 A1 | 9/2011 | Ranjit et al. |
| 2011/0276058 A1 | 11/2011 | Choi et al. |
| 2011/0282189 A1 | 11/2011 | Graumann |
| 2011/0286573 A1 | 11/2011 | Schretter et al. |
| 2011/0295062 A1 | 12/2011 | Solsona et al. |
| 2011/0295370 A1 | 12/2011 | Suh et al. |
| 2011/0306986 A1 | 12/2011 | Lee et al. |
| 2012/0035507 A1 | 2/2012 | George et al. |
| 2012/0046668 A1 | 2/2012 | Gantes |
| 2012/0051498 A1 | 3/2012 | Koishi |
| 2012/0053597 A1 | 3/2012 | Anvari et al. |
| 2012/0059248 A1 | 3/2012 | Holsing et al. |
| 2012/0071753 A1 | 3/2012 | Hunter et al. |
| 2012/0108954 A1 | 5/2012 | Schulhauser et al. |
| 2012/0136372 A1 | 5/2012 | Amat Girbau et al. |
| 2012/0143084 A1 | 6/2012 | Shoham |
| 2012/0184839 A1 | 7/2012 | Woerlein |
| 2012/0197182 A1 | 8/2012 | Millman et al. |
| 2012/0226145 A1 | 9/2012 | Chang et al. |
| 2012/0235909 A1 | 9/2012 | Birkenbach et al. |
| 2012/0245596 A1 | 9/2012 | Meenink |
| 2012/0253332 A1 | 10/2012 | Moll |
| 2012/0253360 A1 | 10/2012 | White et al. |
| 2012/0256092 A1 | 10/2012 | Zingerman |
| 2012/0294498 A1 | 11/2012 | Popovic |
| 2012/0296203 A1 | 11/2012 | Hartmann et al. |
| 2013/0006267 A1 | 1/2013 | Odermatt et al. |
| 2013/0016889 A1 | 1/2013 | Myronenko et al. |
| 2013/0030571 A1 | 1/2013 | Ruiz Morales et al. |
| 2013/0035583 A1 | 2/2013 | Park et al. |
| 2013/0060146 A1 | 3/2013 | Yang et al. |
| 2013/0060337 A1 | 3/2013 | Petersheim et al. |
| 2013/0094742 A1 | 4/2013 | Feilkas |
| 2013/0096574 A1 | 4/2013 | Kang et al. |
| 2013/0113791 A1 | 5/2013 | Isaacs et al. |
| 2013/0116706 A1 | 5/2013 | Lee et al. |
| 2013/0131695 A1 | 5/2013 | Scarfogliero et al. |
| 2013/0144307 A1 | 6/2013 | Jeong et al. |
| 2013/0158542 A1 | 6/2013 | Manzo et al. |
| 2013/0165937 A1 | 6/2013 | Patwardhan |
| 2013/0178867 A1 | 7/2013 | Farritor et al. |
| 2013/0178868 A1 | 7/2013 | Roh |
| 2013/0178870 A1 | 7/2013 | Schena |
| 2013/0204271 A1 | 8/2013 | Brisson et al. |
| 2013/0211419 A1 | 8/2013 | Jensen |
| 2013/0211420 A1 | 8/2013 | Jensen |
| 2013/0218142 A1 | 8/2013 | Tuma et al. |
| 2013/0223702 A1 | 8/2013 | Holsing et al. |
| 2013/0225942 A1 | 8/2013 | Holsing et al. |
| 2013/0225943 A1 | 8/2013 | Holsing et al. |
| 2013/0231556 A1 | 9/2013 | Holsing et al. |
| 2013/0237995 A1 | 9/2013 | Lee et al. |
| 2013/0245375 A1 | 9/2013 | DiMaio et al. |
| 2013/0261640 A1 | 10/2013 | Kim et al. |
| 2013/0272488 A1 | 10/2013 | Bailey et al. |
| 2013/0272489 A1 | 10/2013 | Dickman et al. |
| 2013/0274761 A1 | 10/2013 | Devengenzo et al. |
| 2013/0281821 A1 | 10/2013 | Liu et al. |
| 2013/0296884 A1 | 11/2013 | Taylor et al. |
| 2013/0303887 A1 | 11/2013 | Holsing et al. |
| 2013/0305329 A1* | 11/2013 | Zhang ............... G06K 19/06037 726/6 |
| 2013/0307955 A1 | 11/2013 | Deitz et al. |
| 2013/0317521 A1 | 11/2013 | Choi et al. |
| 2013/0325033 A1 | 12/2013 | Schena et al. |
| 2013/0325035 A1 | 12/2013 | Hauck et al. |
| 2013/0331686 A1 | 12/2013 | Freysinger et al. |
| 2013/0331858 A1 | 12/2013 | Devengenzo et al. |
| 2013/0331861 A1 | 12/2013 | Yoon |
| 2013/0342578 A1 | 12/2013 | Isaacs |
| 2013/0345717 A1 | 12/2013 | Markvicka et al. |
| 2013/0345757 A1 | 12/2013 | Stad |
| 2014/0001235 A1 | 1/2014 | Shelton, IV |
| 2014/0012131 A1 | 1/2014 | Heruth et al. |
| 2014/0031664 A1 | 1/2014 | Kang et al. |
| 2014/0046128 A1 | 2/2014 | Lee et al. |
| 2014/0046132 A1 | 2/2014 | Hoeg et al. |
| 2014/0046340 A1 | 2/2014 | Wilson et al. |
| 2014/0049629 A1 | 2/2014 | Siewerdsen et al. |
| 2014/0058406 A1 | 2/2014 | Tsekos |
| 2014/0073914 A1 | 3/2014 | Lavallee et al. |
| 2014/0080086 A1 | 3/2014 | Chen |
| 2014/0081128 A1 | 3/2014 | Verard et al. |
| 2014/0088612 A1 | 3/2014 | Bartol et al. |
| 2014/0094694 A1 | 4/2014 | Moctezuma de la Barrera |
| 2014/0094851 A1 | 4/2014 | Gordon |
| 2014/0096369 A1 | 4/2014 | Matsumoto et al. |
| 2014/0100587 A1 | 4/2014 | Farritor et al. |
| 2014/0121676 A1 | 5/2014 | Kostrzewski et al. |
| 2014/0128882 A1 | 5/2014 | Kwak et al. |
| 2014/0135796 A1 | 5/2014 | Simon et al. |
| 2014/0142591 A1 | 5/2014 | Alvarez et al. |
| 2014/0142592 A1 | 5/2014 | Moon et al. |
| 2014/0148692 A1 | 5/2014 | Hartmann et al. |
| 2014/0163581 A1 | 6/2014 | Devengenzo et al. |
| 2014/0171781 A1 | 6/2014 | Stiles |
| 2014/0171900 A1 | 6/2014 | Stiles |
| 2014/0171965 A1 | 6/2014 | Loh et al. |
| 2014/0180308 A1 | 6/2014 | von Grunberg |
| 2014/0180309 A1 | 6/2014 | Seeber et al. |
| 2014/0187915 A1 | 7/2014 | Yaroshenko et al. |
| 2014/0188132 A1 | 7/2014 | Kang |
| 2014/0189359 A1* | 7/2014 | Marien ............... H04L 9/3228 713/172 |
| 2014/0194699 A1 | 7/2014 | Roh et al. |

(56) References Cited

U.S. PATENT DOCUMENTS

| | | |
|---|---|---|
| 2014/0130810 A1 | 8/2014 | Azizian et al. |
| 2014/0221819 A1 | 8/2014 | Sarment |
| 2014/0222023 A1 | 8/2014 | Kim et al. |
| 2014/0228631 A1 | 8/2014 | Kwak et al. |
| 2014/0234804 A1 | 8/2014 | Huang et al. |
| 2014/0257328 A1 | 9/2014 | Kim et al. |
| 2014/0257329 A1 | 9/2014 | Jang et al. |
| 2014/0257330 A1 | 9/2014 | Choi et al. |
| 2014/0275760 A1 | 9/2014 | Lee et al. |
| 2014/0275985 A1 | 9/2014 | Walker et al. |
| 2014/0276931 A1 | 9/2014 | Parihar et al. |
| 2014/0276940 A1 | 9/2014 | Seo |
| 2014/0276944 A1 | 9/2014 | Farritor et al. |
| 2014/0288413 A1 | 9/2014 | Hwang et al. |
| 2014/0299648 A1 | 10/2014 | Shelton, IV et al. |
| 2014/0303434 A1 | 10/2014 | Farritor et al. |
| 2014/0303643 A1 | 10/2014 | Ha et al. |
| 2014/0305995 A1 | 10/2014 | Shelton, IV et al. |
| 2014/0309659 A1 | 10/2014 | Roh et al. |
| 2014/0316436 A1 | 10/2014 | Bar et al. |
| 2014/0323803 A1 | 10/2014 | Hoffman et al. |
| 2014/0324070 A1 | 10/2014 | Min et al. |
| 2014/0330288 A1 | 11/2014 | Date et al. |
| 2014/0364720 A1 | 12/2014 | Darrow et al. |
| 2014/0371577 A1 | 12/2014 | Maillet et al. |
| 2015/0039034 A1 | 2/2015 | Frankel et al. |
| 2015/0085970 A1 | 3/2015 | Bouhnik et al. |
| 2015/0134526 A1* | 5/2015 | Russell .................. G06F 21/31 |
| | | 705/44 |
| 2015/0146847 A1 | 5/2015 | Liu |
| 2015/0150524 A1 | 6/2015 | Yorkston et al. |
| 2015/0196261 A1 | 7/2015 | Funk |
| 2015/0213633 A1 | 7/2015 | Chang et al. |
| 2015/0288694 A1* | 10/2015 | Liebl, III .............. H04L 9/3247 |
| | | 713/182 |
| 2015/0335480 A1 | 11/2015 | Alvarez et al. |
| 2015/0342647 A1 | 12/2015 | Frankel et al. |
| 2016/0005194 A1 | 1/2016 | Schretter et al. |
| 2016/0166329 A1 | 6/2016 | Langan et al. |
| 2016/0235480 A1 | 8/2016 | Scholl et al. |
| 2016/0249990 A1 | 9/2016 | Glozman et al. |
| 2016/0302871 A1 | 10/2016 | Gregerson et al. |
| 2016/0320322 A1 | 11/2016 | Suzuki |
| 2016/0331335 A1 | 11/2016 | Gregerson et al. |
| 2017/0135770 A1 | 5/2017 | Scholl et al. |
| 2017/0143284 A1 | 5/2017 | Sehnert et al. |
| 2017/0143426 A1 | 5/2017 | Isaacs et al. |
| 2017/0156816 A1 | 6/2017 | Ibrahim |
| 2017/0195316 A1* | 7/2017 | Murdoch ............ H04L 63/0853 |
| 2017/0202629 A1 | 7/2017 | Maillet et al. |
| 2017/0212723 A1 | 7/2017 | Atarot et al. |
| 2017/0215825 A1 | 8/2017 | Johnson et al. |
| 2017/0215826 A1 | 8/2017 | Johnson et al. |
| 2017/0215827 A1 | 8/2017 | Johnson et al. |
| 2017/0231710 A1 | 8/2017 | Scholl et al. |
| 2017/0258426 A1 | 9/2017 | Risher-Kelly et al. |
| 2017/0273748 A1 | 9/2017 | Hourtash et al. |
| 2017/0296277 A1 | 10/2017 | Hourtash et al. |
| 2017/0360493 A1 | 12/2017 | Zucher et al. |
| 2018/0034802 A1* | 2/2018 | Shelton .................. G06F 21/31 |
| 2018/0285549 A1* | 10/2018 | Sonkar ............ G06Q 20/40145 |
| 2020/0295940 A1* | 9/2020 | Benson ........... G06Q 20/40145 |
| 2022/0038891 A1* | 2/2022 | duPont .................. G06V 10/25 |

* cited by examiner

| Sequence 1 | Sequence 2 | Sequence 3 | Sequence 4 | Sequence 5 | Sequence 6 |
|---|---|---|---|---|---|
| a, _, _ | a, _, _ | _, b, _ | _, b, _ | _, _, c | _, _, c |
| a, b, _ | a, _, c | a, b, _ | _, b, c | a, _, c | _, b, c |
| a, b, c | a, b, c | a, b, c | a, b, c | a, b, c | a, b, c |

| 10 | 15 | 5 | 4 | 23 |
|---|---|---|---|---|
| 14 | 1 | 9 | 16 | 13 |
| 7 | 3 | 22 | 6 | 24 |
| 21 | 17 | 2 | 12 | 8 |
| 18 | 25 | 11 | 20 | 19 |

| #10: 3 | #15: 9 | #5: 0 | #4: C |
|--------|--------|-------|-------|
| #14: 6 | #1: A  | #9: C | #16: 1 |
| #7: A  | #3: B  | #11: 4 | #6: 7 |
| #13: F | #8: 0  | #2: 9 | #12: 7 |

|   | 1 |   |   |   |
|---|---|---|---|---|
|   |   |   | 6 | 8 |
|   | 3 |   |   |   |
|   |   |   | 2 |   |
| 5 |   | 7 | 10 |   |
|   | 9 |   |   | 4 |

Figure 8

| $n$ | $u=5,$ $v=5$ | $u=5,$ $v=10$ | $u=5,$ $v=15$ | $u=5,$ $v=20$ | $u=5,$ $v=25$ |
|---|---|---|---|---|---|
| 10 | 14 | 23 | NA | NA | NA |
| 20 | 20 | 39 | 54 | 62 | NA |
| 30 | 24 | 46 | 67 | 86 | 101 |
| 40 | 26 | 51 | 75 | 98 | 119 |
| 50 | 27 | 55 | 81 | 106 | 130 |
| 60 | 29 | 57 | 85 | 113 | 139 |
| 70 | 30 | 60 | 89 | 118 | 146 |
| 80 | 31 | 62 | 92 | 122 | 152 |
| 90 | 32 | 64 | 95 | 126 | 157 |
| 100 | 33 | 65 | 98 | 129 | 161 |

VALIDATING CREDENTIAL KEYS BASED ON COMBINATIONS OF CREDENTIAL VALUE STRINGS AND INPUT ORDER STRINGS

CROSS REFERENCE TO RELATED APPLICATIONS

This application is a continuation-in-part application of U.S. patent application Ser. No. 17/492,811 filed on Oct. 4, 2021, which is incorporated in its entirety herein.

TECHNICAL FIELD

The present disclosure relates to electronic devices which validate credential keys for users, software products, and/or hardware devices based on user inputs.

BACKGROUND

A credential key may be used to control access to resources of an electronic device and/or to resources that are accessible through the electronic device. The credential key may be associated with a user, such as by associating unique credential keys to different users, e.g., associating secret passwords with unique user identifiers. The credential keys may be associated with software or hardware, such as by associating a unique activation code or access code with software or hardware which may be a resource of the electronic device or accessible through the electronic device. Examples of credential keys can include, without limitation, a numeric personal identification number (PIN) code, cryptographically encoded software activation key, and account login identifier and password. Examples of electronic devices which can contain resources having user access controlled through a credential key include, without limitation, cellular phones, laptop computers, tablet computers, desktop computers, smart appliances which may communicate via the Internet (e.g., thermostats, televisions, refrigerators, etc.), website servers, application servers, and cloud computing servers.

A credential key may be entered by a user through an interface, such as by touch-typing on a virtual display (e.g., touch sensitive display) or physical keypad or keyboard. An algorithm verifies the entered credential key, such as by comparing the entered credential key to a predefined credential key which has been associated with the user, a software resource, a hardware resource, etc. When the entered credential key is properly validated, the user may be provided access to resources of the electronic device and/or which are accessible through the electronic device.

It is becoming increasingly more difficult to ensure that access to resources of electronic devices access remain secure as approaches for brute force trial-and-error access attempts and other hacking techniques are becoming more sophisticated and readily available for malicious purposes. Countermeasures for increasing security have included requiring use of lengthier and more complex credential keys, and requiring more frequency change of credential keys. These countermeasures are imposing increasingly undesirable burdens on the users who must remember and correctly enter the credential keys through sometimes inconvenient user interfaces. such as small touch displays of cellular phones.

There is therefore a substantial continuing need to provide improved secure access to resources of electronic devices while providing an acceptable process for user entry of credential keys.

SUMMARY

Various embodiments disclosed herein are directed to providing an improved process for user entry of credential keys that may provide increased security for access to resources of electronic devices and/or may provide a more user-acceptable process for entry of credential keys.

Some embodiments are directed to an electronic device that includes at least one processor and at least one memory storing instructions executable by the at least one processor. The at least one processor operates to obtain a credential value string indicating a sequence of credential values entered by a user through a user interface as a part of a credential key. The at least one processor operates to obtain an input order string indicating an order in which individual ones of the sequence of credential values were separately entered by the user through the user interface as another part of the credential key. The at least one processor operates to validate the credential key based on the credential value string and based on the input order string.

Some other related embodiments are directed to a computer program product that includes a non-transitory computer readable medium storing instructions executable by at least processor of an electronic device. The instructions obtain a credential value string indicating a sequence of credential values entered by a user through a user interface as part of a credential key. The instructions obtain an input order string indicating an order in which individual ones of the sequence of credential values were separately entered by the user through the user interface as another part of the credential key. The instructions validate the credential key based on the credential value string and based on the input order string.

Using the sequence of credential values entered by a user and the order in which individual ones of the sequence of credential values were separately entered by the user through the user interface, as parts of a credential key enables creation of a stronger credential key that can be much more difficult to overcome using present hacking techniques and/or enables use of a reduced length of credential values (e.g., shorter password) and/or use of less complex credential values (e.g., simpler passwords).

Other electronic devices and computer program products according to embodiments of the inventive subject matter will be or become apparent to one with skill in the art upon review of the following drawings and detailed description. It is intended that all such additional electronic devices and computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings:

FIG. 8 illustrates a grid of symbols which are displayed for touch selection by a user to generate a credential value string and an input order string as two parts of a credential key in accordance with some embodiments of the present disclosure;

FIG. 9 illustrates a table which shows the number of permutations provided by different lengths of credential value strings and number of ones in accordance with some embodiments of the present disclosure;

FIGS. 10A, 10B, 10C, and 10D illustrate four alternative patterns of blocks in a grid which have been selected by a user to generate a credential value string as one part of a credential key and further illustrate associated orders in which the user separately selected the blocks to generate the input order string as another part of credential key, in accordance with some embodiments of the present disclosure;

DETAILED DESCRIPTION

Inventive concepts will now be described more fully hereinafter with reference to the accompanying drawings. in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

When validating credential keys, prior devices have only validated a sequence of credential values, such as an authentication code or password, as finally entered by the user as the entirety of the credential key. Embodiments of the present disclosure create another part of a credential key which indicates an order in which individual ones of the sequence of credential values were separately entered by the user through a user interface. The order of entry carries significant information which is also used for the validation. Using the sequence of credential values entered by a user and the order in which individual ones of the sequence of credential values were separately entered by the user through the user interface, as parts of a credential key enables creation of a stronger credential key that can be much more difficult to overcome using present hacking techniques and/or enables use of a reduced length of credential values (e.g., shorter password) and/or use of less complex credential values (e.g., simpler passwords).

Figure 1:
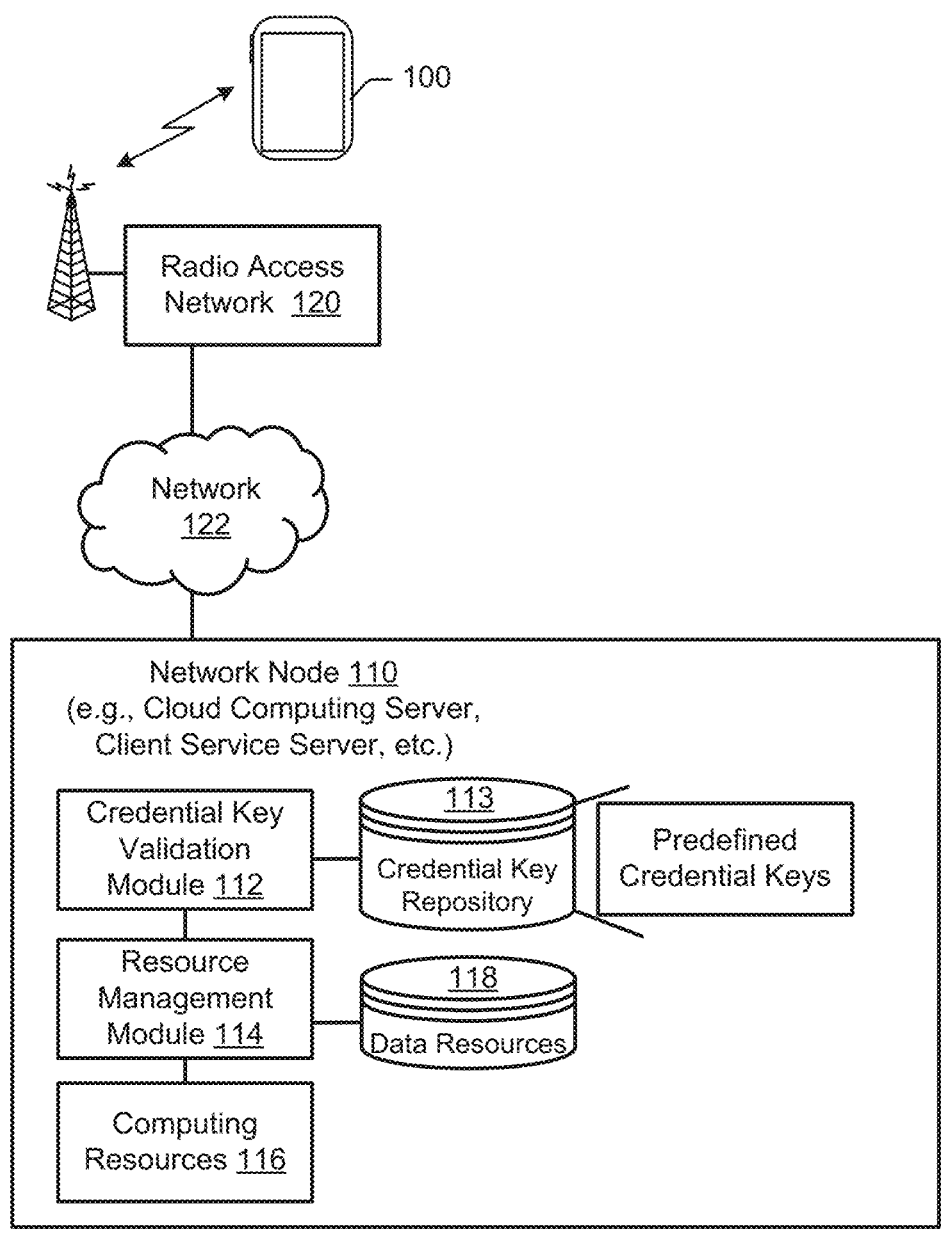
FIG. 1 illustrates a system in which a user can enter a credential key through a user interface of a user device for validation by the user device or by a network node to obtain access to resources of the user device and/or the network node in accordance with some embodiments of the present disclosure.

Some embodiments of the present disclosure are now described in the context of FIG. 1 which illustrates a system in which a user can enter a credential key through a user interface of a user device 100 for validation by the user device 100 or by a network node 110 to obtain access to resources of the user device 100, the network node 110, and/or another electronic device in accordance with some embodiments of the present disclosure. The credential key can include two parts: 1) a credential value string which indicates a sequence of credential values entered by a user through a user interface; and 2) an input order string which indicates an order in which individual ones of the sequence of credential values were separately entered by the user through the user interface as the credential key.

Referring to FIG. 1, the user device 100 communicates through a radio access network 120 and a network 122 (e.g., private network or public network such as Internet) with a network node 110. The user device 100 may include, without limitation, a tablet computer, desktop computer, smartphone, smart appliance such as an Internet thermostat, Internet camera, Internet smart speaker, etc. The network node may include, without limitation, a website server, a client account server, an application data server, a cloud computing server, etc. In an example operation, the network node 110 can operate to validate credential keys entered by the user through the user device 100. The network node 110 may include a credential key validation module 112 which can validate a credential key received for the user device 100, based on predefined credential keys in a repository 113.

Figure 14:
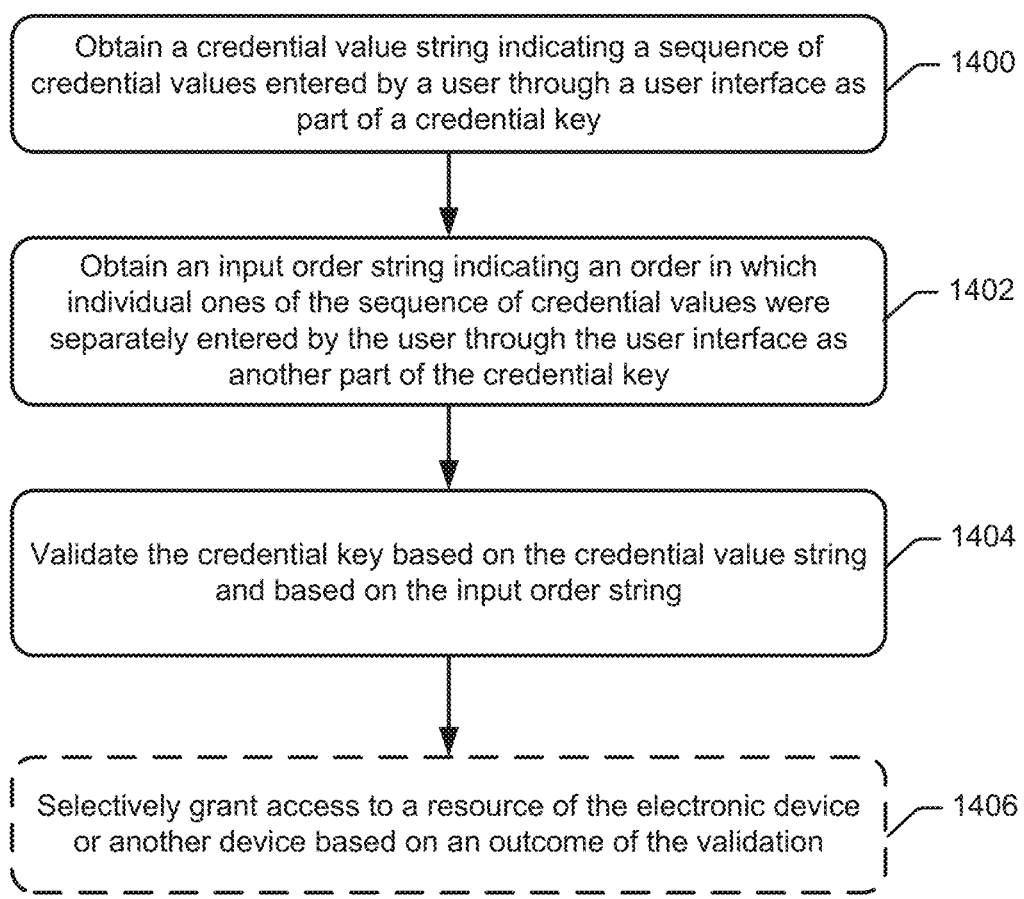
FIG. 14 illustrates a flowchart of operations by an electronic device to obtain a credential value string and an input order string as parts of a credential key and to validate the credential key in accordance with some embodiments of the present disclosure.

FIG. 14 illustrates a flowchart of operations which may be performed by the network node 110 to obtain a credential value string and an input order string as parts of a credential key and to validate the credential key in accordance with some embodiments of the present disclosure.

Referring to FIG. 14, the network node 110 (e.g., via the credential key validation module 112) obtains 1400 a credential value string which indicates a sequence of credential values entered by a user through a user interface as part of a credential key The network node 110 (e.g., via the credential key validation module 112) also obtains 1402 an input order string which indicates an order in which individual ones of the sequence of credential values were separately entered by the user through the user interface as another part of the credential key. In the example of FIG. 1, the network node obtains 1400 and 1402 the credential value string and the input order string from the user device 100.

The network node 110 (e.g., via the credential key validation module 112) validates 1404 the credential key based on the credential value string and based on the input order string.

In one embodiment, the validation 1404 includes comparing the sequence of credential values indicated by the credential value string to credential values of a predefined credential value string for the user and based on comparing the order indicated by the input order string to a predefined input order of a predefined credential order string for the user.

In another alternative embodiment, the validation 1404 includes comparing a credential key value, which is generated based on an algorithmic combination of the credential value string and the input order string, to a predefined credential key value. For example, the validation 1404 may include combining the credential value string and the input order string to generate a combined value that is hashed to form the credential key value. The credential key value can then be compared to the predefined credential key value which can correspond to a hashed value that was formed from an algorithmic combination of a predefined credential value string (e.g., defined by the user, a software developer, and/or another individual or process) and a predefined input order string (e.g., also defined by the user, the software developer, and/or the other individual or process). Before the respective hashing operations for the credential key value and the predefined credential key value, the inputs to the respective hashing operations may each be combined with a random string in a defined manner to further complicate any hacking attempts. Validation is considered successful when the credential key value matches the predefined credential key value. Comparing hashed-based values is more secure than comparing plain-text strings which may be discoverable through hacking attempts.

In accordance with the alternative embodiments, the repository 113 can store either: 1) pairs of a predefined credential value string and a predefined credential order string which are associated with a user, such as by associating different pairs of a predefined credential value string and a predefined credential order string with different users; or 2) a predefined credential key value which is associated with the user, such as by associating different predefined credential key values with different users. Alternatively or additionally, the repository 113 can associate the pairs of a predefined credential value string and a predefined credential order string or the predefined credential key values with identified software or hardware. For example, the repository 113 may associate different pairs of a predefined credential value string and a predefined credential order string or different predefined credential key values with different software identifiers or hardware identifiers, which may include associating a unique activation code or access code with software or hardware which may be a resource of the electronic device (e.g., 100 or 110) or accessible through the electronic device.

In one embodiment, the credential key validation module 112 operates to access the repository 113 using an identifier of the user to obtain the predefined credential value string and the predefined credential order string or to obtain the predefined credential key value for use in validation. In another embodiment, the credential key validation module 112 operates to access the repository 113 using an identifier of a software resource and/or a hardware resource to obtain the predefined credential value string and the predefined credential order string or to obtain the predefined credential key value for use in validation.

The network node 110 (e.g., via a resource management module 115) may also grant 1406 the user access to resources of the network node 110 based on determining that the sequence of credential values indicated by the credential value string matches the credential values of the predefined credential value string and based on determining that the order indicated by the input order string matches the predefined input order of the predefined credential order string. Alternatively the network node 110 may also grant 1406 the user access to resources of the network node 110 based on determining that the credential key value matches the predefined credential key value. For example, the network node 110 may grant the user access to data resources 118, which may include one or more of user account data, streaming media (e.g., movies, television shows, etc.), application data, website data, software program code, etc., and/or may grant the user access to computing resources 116, which may include one or more of processor resources, volatile and/or non-volatile memory resources, communication resources of a wireless radio access resources of a radio access network, communication resources of a wired network, etc.

Figure 2:
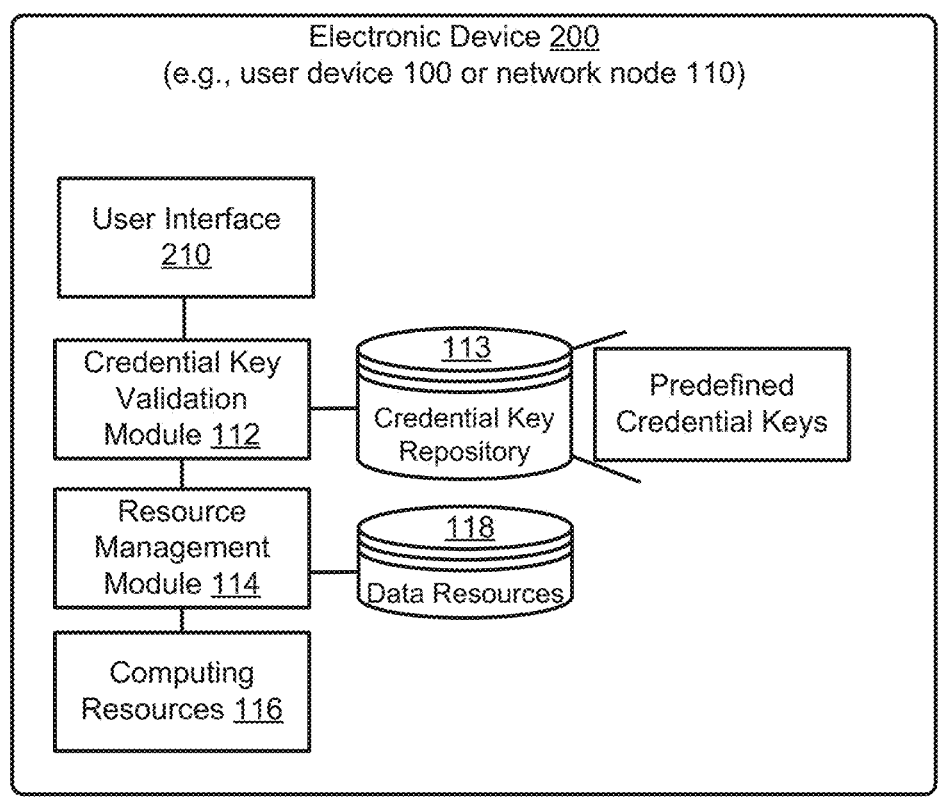
FIG. 2 is a block diagram illustrating components of an electronic device which verifies a credential key to control access to resources of the electronic device in accordance with some embodiments of the present disclosure.

In some other embodiments, an electronic device can operate stand-alone to validate a credential key from a user. The term "electronic device" is used more generally to cover any device which is operative to obtain and validate a credential key (i.e., pair of credential value string and input order string), and can include but is not limited to the user device 100 or the network node 110 of FIG. 1. FIG. 2 is a block diagram illustrating components of an electronic device 200 which verifies a credential key to control access to resources of the electronic device 200 in accordance with some embodiments of the present disclosure.

The electronic device 200 (e.g., via the credential key validation module 112) obtains through a user interface 210 a credential value string which indicates a sequence of credential values entered by a user through a user interface as part of a credential key. The user interface 210 may be a physical interface, e.g., keyboard or keypad, or may be virtual such as through a touch display representation. The electronic device 200 (e.g., via the credential key validation module 112) also obtains an input order string which indicates an order in which individual ones of the sequence of credential values were separately entered by the user through the user interface as another part of the credential key. The electronic device 200 (e.g., via the credential key validation module 112) validates the credential key based on: 1) comparing the sequence of credential values indicated by the credential value string to credential values of a predefined credential value string for the user and based on comparing the order indicated by the input order string to a predefined input order of a predefined credential order string for the user; or 2) comparing the credential key value to the predefined credential key value.

The electronic device 200 (e.g., via a resource management module 115) may also grant 1406 the user access to resources of the network node 110 based on: 1) determining that the sequence of credential values indicated by the credential value string matches the credential values of the predefined credential value string and based on determining that the order indicated by the input order string matches the predefined input order of the predefined credential order string; or 2) determining that the credential key value matches the predefined credential key value. For example, the electronic device 200 may grant the user access to data resources 118 and/or may grant the user access to computing resources 116.

Example operations through which an electronic device can obtain a credential value string and an input order string as parts of a credential key from a user for validation are now described in the context of FIGS. 3 through 8 in accordance with some embodiments of the present disclosure.

In a conventional validation process for an electronic device, when using an English keyboard, values (symbols) of a credential key are entered from left to right as individual symbols with a separate key being used to signal that entry is complete. Some user interfaces allow a user to move to the right or left using arrow keys, mouse selections, and/or by touching different areas of a touch sensitivity display. The conventional electronic device processes the information after all symbol entries are complete, usually signaled by a different key, such as the "Enter" keyboard key. In this situation, the sequence in which the symbols was entered does not matter, since only the final sequence of credential values is used as the credential key to be validated.

In accordance with some embodiments of the present disclosure, an electronic device operates to process the credential values as the user enters each one. A credential key is formed that has two parts: 1) a credential value string indicating a sequence of credential values entered by a user through a user interface as a part of a credential key; and 2) an input order string indicating an order in which individual ones of the sequence of credential values were separately entered by the user through the user interface as another part of the credential key.

Figures 3, 4, 5:
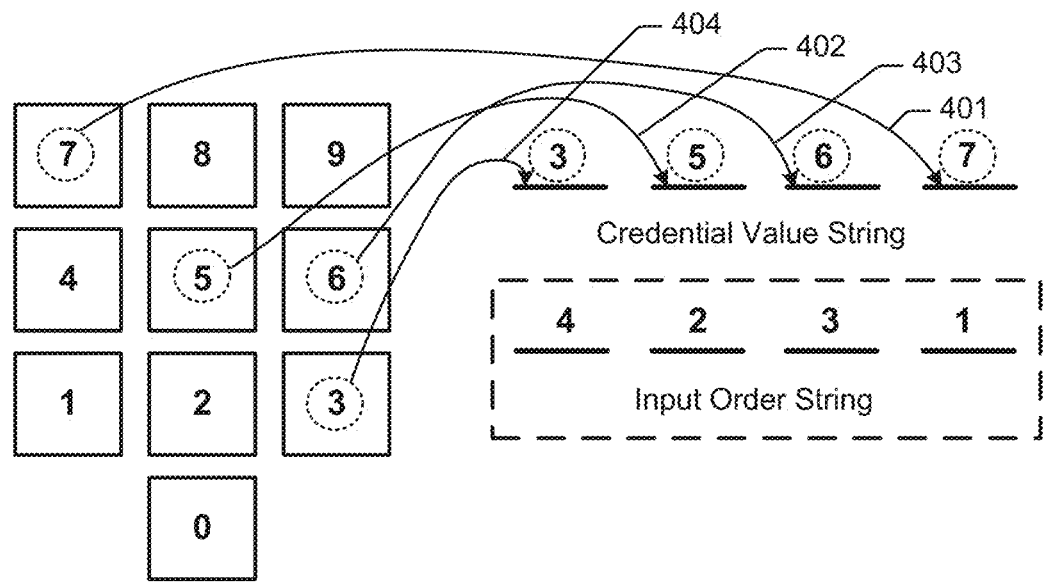
FIG. 3 illustrates alternative sequences in which a user may enter credential values, with operations forming a credential value string indicating a sequence of the credential values entered by the user as one part of the credential key and other operations forming an input order string indicating an order in which individual ones of the sequence of credential values were separately entered by the user as another part of the credential key, in accordance with some embodiments of the present disclosure.
FIG. 4 illustrates a credential value string and an input order string which are generated as two parts of a credential key in accordance with some embodiments of the present disclosure based on a user entering a credential values through a keypad.
FIG. 5 illustrates a credential value string and an input order string which are generated as two parts of a credential key based on a user moving (e.g., dragging on a touch display) and/or selecting symbols arranged in a grid, in accordance with some embodiments of the present disclosure.

FIG. 3 illustrates alternative sequences in which a user may enter credential values, with operations forming a credential value string indicating a sequence of the credential values entered by the user as one part of the credential key and other operations forming an input order string indicating an order in which individual ones of the sequence of credential values were separately entered by the user as another part of the credential key, in accordance with some embodiments of the present disclosure.

Referring to FIG. 3, a credential value string is formed as a sequence of three credential values. Each credential value can take r possible values which creates $r^3$ possible combinations of credential value strings. For example, a user can enter a three-length credential value string "a, b, c" in six different orders as shown. The first row shows the status at the end of entering one credential value, the second two row at the end of entering the second credential value, and the third row at the end of entering the third credential value.

Though the credential value string created by each sequence is the same, the various sequences of entry encode 6 input order strings.

More generally, when entering an n-symbol, each with m bits, credential value string, the place of the first credential value can be chosen in n possible ways. The position of the second credential value can be chosen in n−1 possible ways. Extending this further, the total number of possibilities encoded in the sequence of placement of the credential value is $n·(n-1)·(n-2) \ldots ·1=n!$. If each credential value can take $r=2^m$ possible values, the number of possibilities become $n!·r^n$. Thus, the number of bits the credential key can encode is $\log_2 (n!·r^n)=\log: n!+n \log_2 r=\log_2 n!+n\,m$.

When a credential value string has 4 credential values, where each credential value is represented by two values or one bit (i.e., n=4, m=1). The user can select a position with a click of a mouse or display touch and entering a 0 or 1 at a selected sequence position in the credential value string. The user entry may alternatively by performed by dragging a "1" or "0" credential value to the desired sequence position in the credential value string. The amount of information encoded is then $\log_2 4!+1·4=4.6+4=16.6$, or 16 bits when rounded below. If the user enters or drags a nibble for each credential value, the amount of information carried will be $\log_2 4!+4·4=4.6+16=20.6$, or 20 bits when rounded below.

The increased number of permutations created for a defined length credential value string when combined with the input order string, increases rapidly as shown in the table below.

| | | [log2n! + nm] | |
|---|---|---|---|
| n | log2n! | m = 1 | m = 4 |
| 3 | 2.6 | 5 | 14 |
| 4 | 4.6 | 8 | 20 |
| 5 | 6.9 | 11 | 26 |
| 6 | 9.5 | 15 | 33 |
| 9 | 18.5 | 27 | 54 |
| 16 | 44.2 | 60 | 108 |
| 25 | 83.7 | 108 | 183 |
| 36 | 138.1 | 174 | 282 |
| 49 | 208.6 | 257 | 404 |

In another embodiment, an enhancement to encoding a sequence by allowing multiple selection of the same cell. The sequence of erasing symbols from a cell may be used to encode additional information.

In one exemplary embodiment, by example, as shown below, an initial entry of hexadecimal symbols is shown below:

| | | | |
|---|---|---|---|
| #10: 3 | #15: 9 | #5: 0 | #4: C |
| #14: 6 | #1: A | #9: C | #16: 1 |
| #7: A | #3: B | #11: 4 | #6: 7 |
| #13: F | #8: 0 | #2: 9 | #12: 7 |

It was disclosed earlier, that each symbol is provided with a r−2m values yields n! times r to n different possibilities. For each of these possibilities, the n-symbol can be erased in n! different ways. As a result, the total number of possibilities of entry following by erasing becomes (n!) squared times r(n). The number of bits encoded is then:

$$2 \log_2 n!+nm.$$

The increased number of permutations created for a defined length credential value string when combined with the input order string, increases rapidly as shown in the table below.

| n | $\log_2 n!$ | [$\log_2 n!$ + nm] | | [$2\log_2 n!$ + nm] | |
|---|---|---|---|---|---|
| | | m = 1 | m = 4 | m = 1 | m = 4 |
| 3 | 2.6 | 5 | 14 | 10 | 19 |
| 4 | 4.6 | 8 | 20 | 16 | 28 |
| 5 | 6.9 | 11 | 26 | 22 | 37 |
| 6 | 9.5 | 15 | 33 | 30 | 48 |
| 9 | 18.5 | 27 | 54 | 54 | 81 |
| 16 | 44.2 | 60 | 108 | 120 | 168 |
| 25 | 83.7 | 108 | 183 | 216 | 271 |
| 36 | 138.1 | 174 | 282 | 348 | 456 |
| 49 | 208.6 | 257 | 404 | 514 | 661 |

In another embodiment, the same technique may be applied to a smaller set of inputs or only a single input for a binary input. As a result, the input and the erasing of the input in different ways enables a increase the amount of coded information. For example, in an n long sequence with a number of ones between u and v, the number of possibilities or permutations increase using the following equation:

$$\sum_{k=u}^{v} \frac{n!}{(n-s)!} \text{ to } \sum_{k=u}^{v} \frac{n!s!}{(n-s)!}$$

FIG. 4 illustrates a credential value string and an input order string which are generated as two parts of a credential key in accordance with some embodiments of the present disclosure based on a user entering a credential values through a virtual keypad displayed on a touch sensitive display.

Referring to FIG. 4, when the user inputs are made through a touch sensitive display that provides drag-and-drop operations, as a first input the user touches the number "7" on the displayed keypad and drags 401 the number "7" to the fourth location (furthest right) in the credential value string. As a second input the user similarly drags 402 the number "5" to the second location in the credential value string. As a third input the user similarly drags 403 the number "6" to the third location in the credential value string. As a fourth input the user similarly drags 404 the number "3" to the first location in the credential value string. The operations respond to the user inputs by generating a credential value string of "3567" indicating the sequence of credential values entered by a user through the user interface as a part of a credential key, and further generates an input order string as "4231" indicating an order in which individual ones of the sequence of credential values were separately entered by the user through the user interface as another part of the credential key.

The electronic device then validates the credential key based on the sequence of credential values "3567" indicated by the credential value string and based on the order "4231" indicated by the input order string FIG. 5 illustrates a credential value string and an input order string which are generated as two parts of a credential key based on a user moving (e.g., dragging on a touch display) and/or selecting symbols arranged in a grid, in accordance with some embodiments of the present disclosure. From the table above, the same number of bits can be encoded by a sequence of a 25-value (25-symbol) binary message. The 25-value (25-symbol) message can be arranged in a 5×5 grid such as shown in FIG. 5 for intuitive viewing and manipulation by a user. A user can enter a credential key by touch-selecting symbols to turn white or dark (i.e., set value values) and/or dragging white and dark symbols within the 5×5 grid. The final pattern of symbols (e.g., the illustrated locations of the white and dark symbols) within the 5×5 grid becomes the credential value string part of the credential key and the order (e.g., the illustrated numbers within the symbols) in which individual ones of the symbols were selected and/or moved by the user becomes the input order string part of the credential key.

Instead of dragging of a white or dark symbol, a user could also touch-select or mouse-click a symbol once to define a white symbol and touch or click it again to define a dark symbol.

Corresponding operations that can be performed by the electronic device can include to display a plurality of indicia on a display device, where each of the indicia indicates a location where the user can enter one of the credential values. The operations generate the credential value string to indicate credential values entered by the user at the locations indicated by the plurality of indicia, and generate the input order string to indicate an order in which individual ones of the credential values were entered at the locations indicated by the plurality of indicia were selected by the user.

Figures 6, 7:
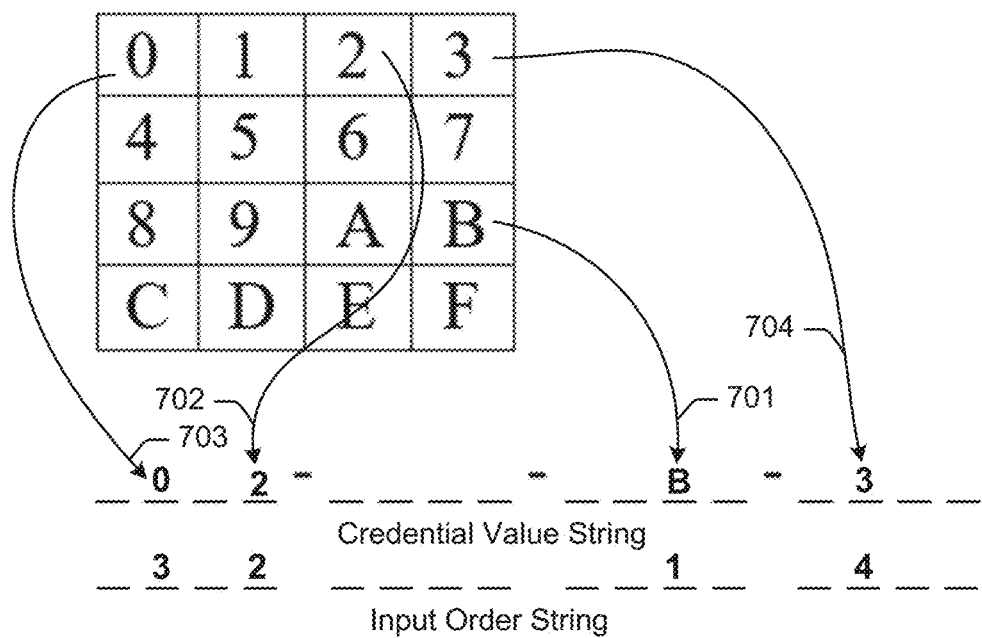
FIG. 6 illustrates a credential value string and an input order string which are generated as two parts of a credential key based on a user moving (e.g., dragging on a touch display) symbols arranged in a grid, in accordance with some embodiments of the present disclosure.
FIG. 7 illustrates a credential value string and an input order string which are generated as two parts of a credential key based on a user dragging symbols from a grid to spaced apart locations on a display device to assemble a sequence which forms the credential value string in accordance with some embodiments of the present disclosure.
Figure 11A:
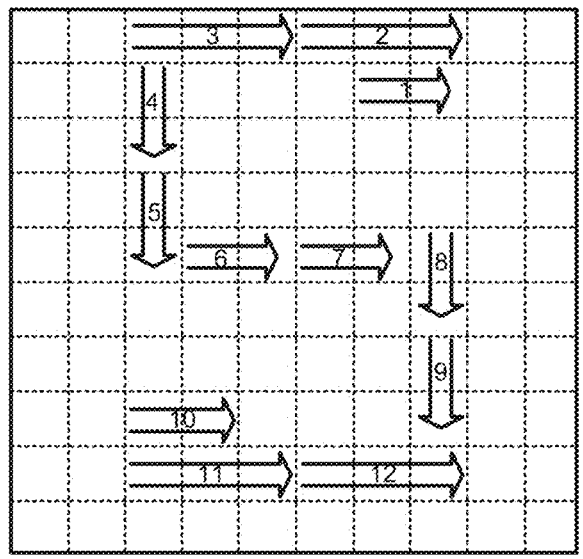
FIGS. 11A, 11B, 11C, and 11D illustrate four alternative patterns of blocks in a grid which have been selected by a user to form a stylized "S" as a credential value string for one part of a credential key and further illustrate associated orders in which the user separately selected the blocks to generate the input order string as another part of credential key, in accordance with some embodiments of the present disclosure.
Figure 11B:
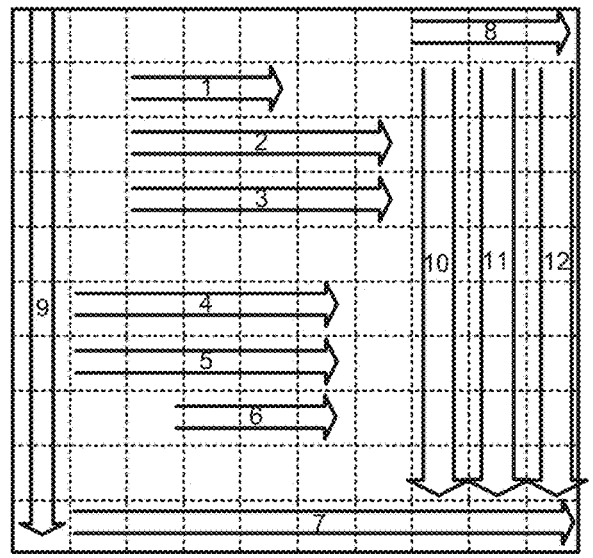
Figure 11C:
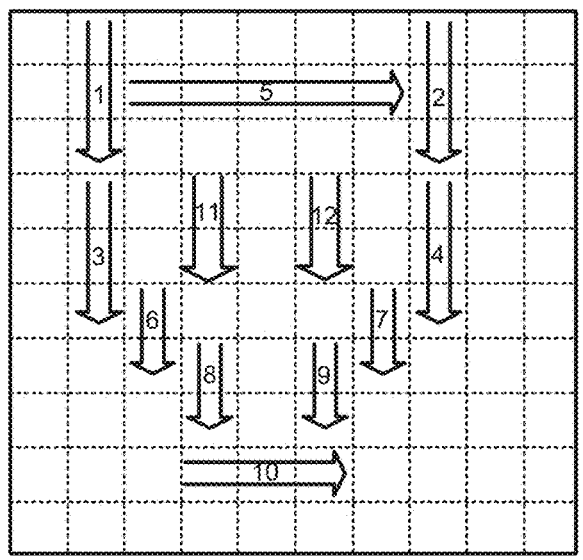
Figure 11D:
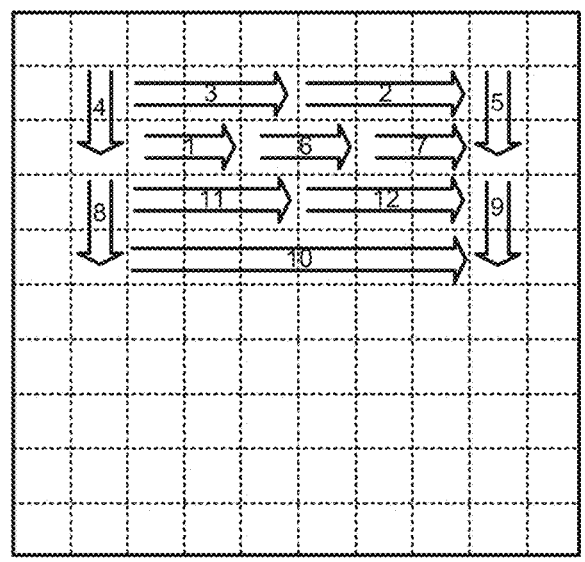

Alternately, the user can drag a hexadecimal symbol in a 4×4 grid in the sequence illustrated in FIG. 6. FIG. 6 illustrates a credential value string and an input order string which are generated as two parts of a credential key based on a user moving (e.g., dragging on a touch display) symbols arranged in a grid, in accordance with some embodiments of the present disclosure. The credential value string part of the credential key, is generated to indicate the sequence of hexadecimal symbols in the 4×4 grid (e.g., the arrangement of hexadecimal symbols in the 4×4 grid). The input order string part of the credential key is generated to indicate an order (illustrated in FIG. 6 by "#" input order numbers) in which individual ones of the sequence of hexadecimal symbols were separately dragged by the user to final locations in the 4×4 grid.

In some other embodiments, a user drags a credential value from a table to a credential string line which is displayed on a display device. FIG. 7 illustrates a credential value string and an input order string which are generated as two parts of a credential key based on a user dragging symbols from a grid to spaced apart locations on a display device to assemble a sequence which forms the credential value string in accordance with some embodiments of the present disclosure.

Referring to FIG. 7, as a first input the user drags 701 the credential symbol (value) "B" from the table to the 11th location in the credential value string. As a second input the user drags 702 the credential symbol (value) "2" from the table to the 4th location in the credential value string. As a third input the user drags 703 the credential symbol (value) "0" from the table to the 1st location in the credential value string. As a fourth input the user drags 704 the credential symbol (value) "3" from the table to the 14th location in the credential value string. Continuing in this manner, the user separately enters the rest of the credential values into the remaining locations in the credential value string. The electronic device also concurrently generates the corresponding input order string, which may or may not be displayed to the user. In the illustrated example of FIG. 7, the input order string has been shown which was generated based on the order of the four user inputs. Thus, the partially completed credential value string includes values ".0.2 . . . B..3.." and the partially completed input order string includes values ".3.2 . . . 1.4..".

Corresponding operations that may be performed by an electronic device can include displaying a plurality of values at spaced apart locations on a display device. The operations assemble a sequence of values which is displayed on the display device responsive to user commands moving individual ones of the plurality of values to locations in the assembled sequence of values. The operations generate the credential value string to indicate the assembled sequence of values responsive to a user entry indicating completion of assembly of the credential value string, and generate the input order string to indicate an order in which individual ones of the plurality of values were moved by the user to the locations in the sequence of values.

When the display device includes a touch sensitive display, the electronic device may operate to assemble the sequence of values which is displayed on the display device responsive to sensing the user drag individual ones of the plurality of values to locations in the assembled sequence of values.

The operations of these embodiments may be used for any type of credential key, including without limitation, passwords, PINs, software activation keys, etc.

Many known validation systems require user to adopt complex passwords which includes using "at least one number, one upper case letter, and one special symbol", which provides about 70 different possibilities for each symbol. For an 8-symbol sequence, the password strength is $\log_2(8 \times 70) = 49.0$ bits. An even higher complexity of 54 bits can be obtained by dragging just 9 symbols, where each symbol represents 4 bits (0 through F). Dragging symbols on a touch display may be considered more user-friendly by users than attempting to remember and entering a complex password through, for example, a small cellular phone touch sensitive display.

Some other embodiments are directed to a credential value string being input as a sequence of 1-bit symbols of length n. A user may only enter the logic "1" values in the bit sequence, and not need to enter the logic "0" values, or vice versa. The number of permutations, i.e., the number of sequences now depend on the number of logic "1" values in the sequence. A sequence with s logic "1" values can be arranged in n positions in $$_s^n P = \frac{n!}{(n-s)!}$$

ways. Thus, the total number of sequences is $$\sum_{k=0}^{n} \frac{n!}{(n-s)!} = \lfloor e * n! \rfloor,$$

where e is Euler's number, approximately 2.72. Thus, these sequences can encode $\log_2 \lfloor e \cdot n! \rfloor$ number of bits. The table below illustrates example sample values according to this encoding of a credential value string:

| n | $\log_2 \lfloor e \cdot n! \rfloor$ |
|---|---|
| 3 | 4 |
| 4 | 6 |
| 5 | 8 |
| 6 | 10 |
| 16 | 45 |
| 25 | 85 |
| 36 | 139 |
| 49 | 210 |

Continuing with the example with 108 bits, n=30 with $\log_2 \lfloor e \cdot n! \rfloor = 109$. In other words, a user can encode a 108-bit message by clicking positions in a 6×5 grid in a defined order. FIG. 8 illustrates a grid of symbols which are displayed for touch selection by a user to generate a credential value string and an input order string as two parts of a credential key in accordance with some embodiments of the present disclosure. In the grid of FIG. 8, a user has selected 10 symbols in the 6×5 grid in the input order indicated by the 1-10 numbers within the selected symbol locations. The credential value string is generated to indicate locations of the sequence of selected symbols, as a part of a credential key. The input order string is generated to indicate an order in which individual ones of the sequence of selected symbols were separately selected by the user, as another part of the credential key.

Entering long sequences one click at a time, may be considered cumbersome by users. Short sequences are easier to compromise and may be unacceptably weak to malicious attack. To address these concerns, some embodiments increase n and limit s in the previous example. For example, to limit the number of ones between u and v, then the number of possibilities become $$\sum_{k=u}^{v} \frac{n!}{(n-s)!}.$$

This can be computed using the following Python code:
log₂(sum([factorial(n)/factorial(n−s) for s in range(u,v+1)]))

FIG. 9 illustrates a table which shows the number of permutations provided by different lengths of credential value strings and number of ones in accordance with some embodiments of the present disclosure.

The higher values of n can be leveraged to allow users to "draw" patterns instead of selecting (e.g., clicking or touch-selecting) symbols one at a time. FIGS. 10A, 10B, 10C, and 10D illustrate four alternative patterns of blocks in a grid which have been selected by a user to generate a credential value string as one part of a credential key and further illustrate associated orders in which the user separately selected the blocks to generate the input order string as another part of credential key, in accordance with some embodiments of the present disclosure.

Figures 10A, 10B, 10C, 10D:
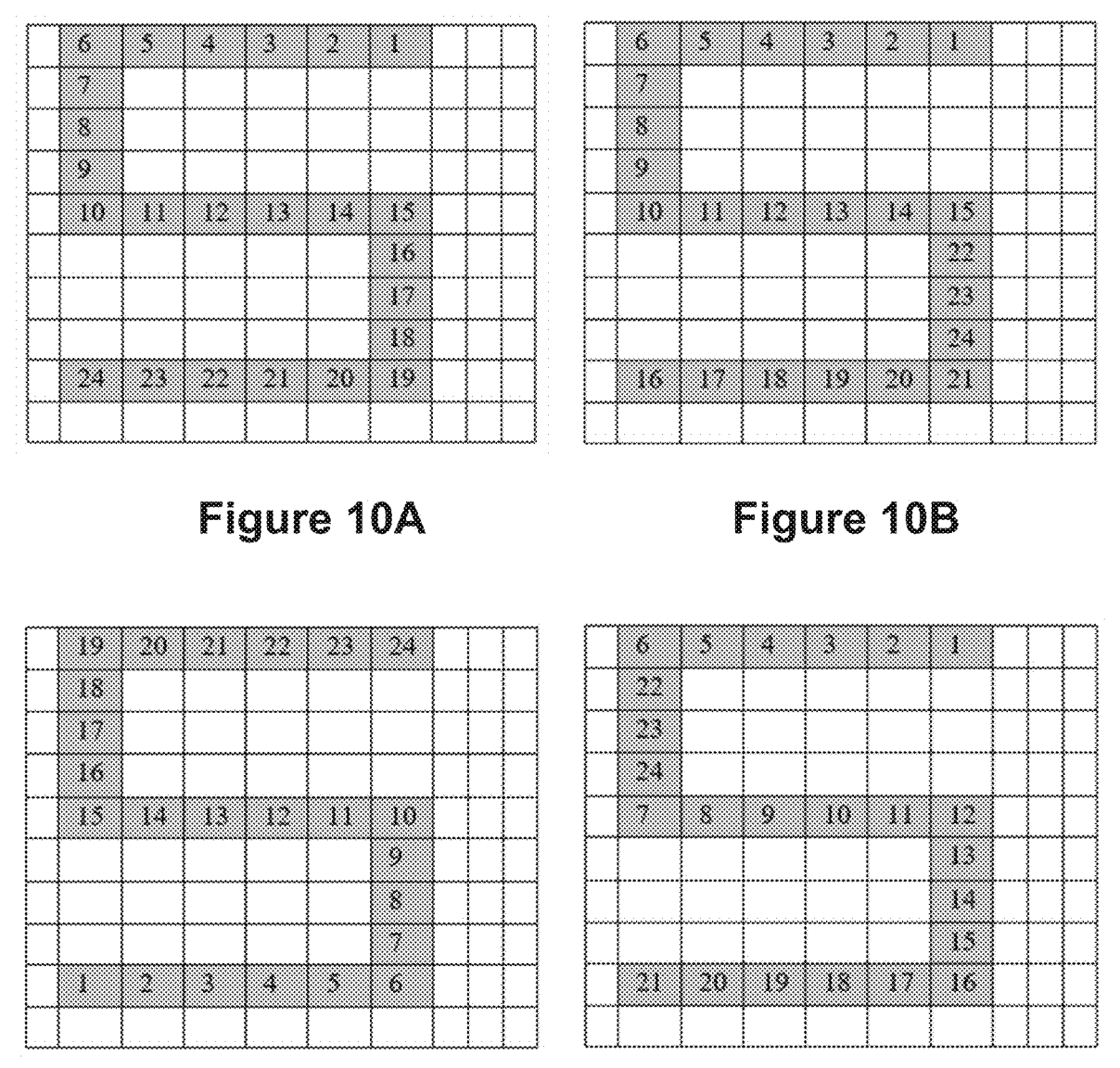

In the embodiment of FIG. 10A, the user has drawn a block-S pattern which forms the credential value string part of a credential key. The Figure also illustrates through the numbers within the blocks the order in which individual ones of the sequence of blocks were selected by the user, e.g., by dragging a finger on a touch-screen or mouse cursor, to define the input order string as another part of the credential key.

Each of FIGS. 10B, 10C, and 10D further illustrate that the user has drawn the same block-S pattern as shown in FIG. 10A to form the credential value string, but with different orders in which individual ones of the sequence of blocks were selected by the user to define the input order strings. Thus, although the user input in FIGS. 10A, 10B, 10C, and 10D all result in the same credential value string, each of these figures results in a different input order strings. The resulting credentials keys (combining the credential value string and the input order string) for each of FIGS. 10A, 10B, 10C, and 10D are therefore different.

Some users may prefer to drag a finger on a touch display or mouse cursor on a display to input a credential key but drawing line segments, instead of clicking on individual block or symbol locations on the display.

A credential value string may be generated from a plurality of line segments spanning multiple locations on a display. If the line segments have a minimum length of 2 locations (e.g., two blocks), they can be mirrored to double the number of possible entries. A mirrored segment is one in which the locations get clicked in reverse order (e.g. left to right vs. right to left). For symbols divided into n segments, the possible combinations are n+log$_2$n!. The number of bits this can encode can become very large (e.g., 40 bits for n=12). Examples of symbols broken into 12 different segments are shown in FIGS. 11A, 11B, 11C, and 11D.

FIGS. 11A, 11B, 11C, and 11D illustrate four alternative patterns of blocks in a grid which have been selected by a user to form a stylized "S" as a credential value string for one part of a credential key and further illustrate by the numbers associated orders in which the user separately selected the blocks to generate the input order string as another part of credential key, in accordance with some embodiments of the present disclosure.

These symbols can be shifted left-to-right or top-to-bottom to encode additional bits. Mirroring asymmetric symbols can also lead to additional 1 bit encoding, to reduce the total number of unique patterns.

Corresponding operations that may be performed by an electronic device can include to display an n by m grid of indicia on a display device which are separately selectable by the user, wherein n and m are positive plural integers. The operations generate the credential value string to indicate which of the indicia of the grid have been selected by the user, and generate the input order string to indicate an order in which individual ones of the indicia of the grid were selected by the user.

The operations may generate the credential value string to further indicate which of the indicia of the grid have not been selected by the user.

The operations may generate of the credential value string by setting a defined binary value for locations in the credential value string corresponding to individual ones of the indicia of the grid that are selected by the user.

The operations may generate of the credential value string by setting each location in the credential value string to a defined binary value, and then toggling a binary value at a location in the credential value string from a current binary value to an opposite new binary value responsive to selection of one of the indicia of the grid by the user corresponding to the location in the credential value string.

The operations may change color, shading, and/or shape of individual ones of the grid of indicia displayed on the display device responsive to user selection of the individual ones of the indicia of the grid.

The operations may generate the input order string to indicate an order in which individual ones of the indicia of the grid were selected by the user dragging a finger across the individual ones of the indicia displayed on a touch sensitive display device or an order in which individual ones of the indicia of the grid were selected by the user dragging a cursor across the individual ones of the indicia while a mouse selection button was actuated.

Various embodiments of the present disclosure may thereby provide one or more of: 1) increased cryptographic strength of a credential key without increasing the required length of the user's inputted credential value string; 2) improved usability from a user's perception by enabling the user to sequentially drag symbols which have been display on a display device to locations on the display to define the sequential value string and input order string parts of a credential key for validation; 3) improved usability from a user's perception by enabling the user to click on locations on the screen to define the sequential value string and input order string parts of a credential key for validation; and 4) improved usability from a user's perception by enabling the user to define the sequential value string and input order string parts of a credential key by dragging a finger or mouse cursor through a sequence of strokes that draws a desired symbol.

Figure 12:
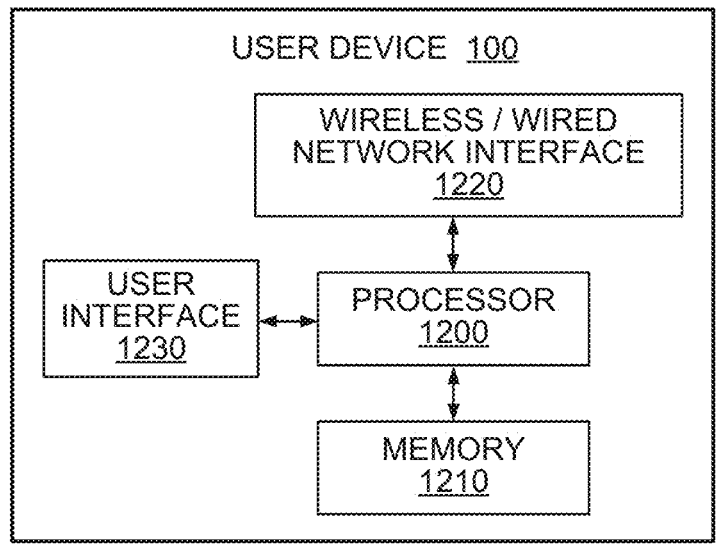
FIG. 12 illustrates components of a user device which are configured to operate in accordance with some embodiments of the present disclosure.

FIG. 12 illustrates components of a user device 100 which are configured to operate in accordance with some embodiments of the present disclosure. Referring to FIG. 12, the user device 100 can include a wired and/or wireless network interface circuit 1220, a user interface 1230 (e.g., touch sensitive display, physical keyboard, physical keypad, mouse, etc.), at least one processor circuit 1200 (processor), and at least one memory circuit 1210 (memory). The processor 1200 is connected to communicate with the other components. The memory 1210 stores program code that is executed by the processor 1200 to perform operations disclosed herein. The memory 1210 may also store the credential key repository 113 of FIG. 1. The processor 1200 may include one or more data processing circuits (e.g., microprocessor and/or digital signal processor), which may be collocated or distributed across one or more data networks. The processor 1200 is configured to execute the program code in the memory 1210, described below as a computer readable medium, to perform some or all of the operations and methods for one or more of the embodiments disclosed herein for a user device or other electronic device.

Figure 13:
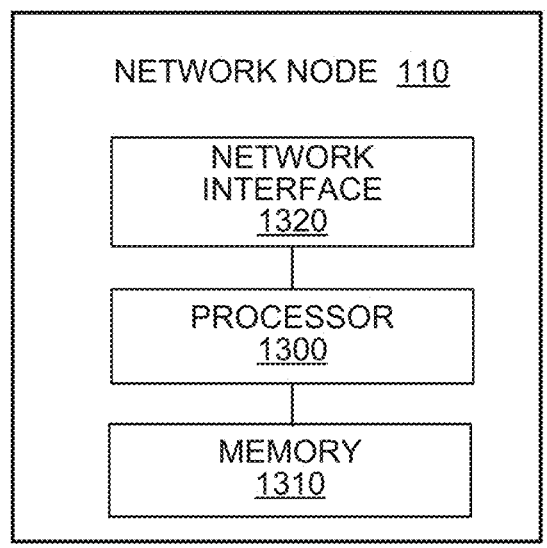
FIG. 13 illustrates components of a network node which are configured to operate in accordance with some embodiments of the present disclosure.

FIG. 13 illustrates components of a network node 110 which are configured to operate in accordance with some embodiments of the present disclosure. Referring to FIG. 13, the network node 110 can include a wired and/or wireless network interface circuit 1320, at least one processor circuit 1300 (processor), and at least one memory circuit 1310 (memory). The network node 110 may include a user interface adapted to receive a credential key from a user. The processor 1300 is connected to communicate with the other components. The memory 1310 stores program code that is executed by the processor 1300 to perform operations disclosed herein for a network node or other electronic device. The memory 1310 may also store the credential key repository 113 of FIG. 1. The processor 1300 may include one or more data processing circuits (e.g., microprocessor and/or digital signal processor), which may be collocated or distributed across one or more data networks.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. An electronic device comprising:
 a display;
 at least one processor coupled to the display; and
 at least one memory storing instructions executable by the at least one processor to
  display on the display device a plurality of spatially separated input locations each configured to receive a credential value;
  display on the display device a plurality of credential values each of which can be user-selected into each of the displayed spatially separated input locations on the display;
  obtain a credential value string indicating a sequence of the credential values entered by a user through a user interface as a part of a credential key defining a password,
  obtain an input order string indicating an order in which individual ones of the sequence of credential values were separately user-selected into the displayed spatially separated input locations as another part of the credential key by:
   storing for each entered credential value the location of the entered credential value among the plurality of spatially separated input locations; and storing when the each credential value was entered through the user interface relative to the other credential values, and validate the credential key based on the obtained credential value string and based on the input order string which indicates the order in which the sequence of credential values were user-selected into the displayed input locations.

2. The electronic device of claim 1, wherein the at least one processor is further operative to validate the credential key based on:

comparing the sequence of credential values indicated by the credential value string to credential values of a predefined credential value string and based on comparing the order indicated by the input order string to a predefined input order of a predefined credential order string.

3. The electronic device of claim 2, wherein the at least one processor is further operative to:

access a repository of credential keys using an identifier of the user to obtain the predefined credential value string and the predefined credential order string for the user.

4. The electronic device of claim 1, wherein the at least one processor is further operative to validate the credential key based on:

comparing a credential key value generated based on an algorithmic combination of the credential value string and the input order string to a predefined credential key value.

5. The electronic device of claim 1, wherein the at least one processor is further operative to:

selectively grant the user access to resources of the electronic device based on an outcome of the validation of the credential key.

6. The electronic device of claim 1, wherein the at least one processor is further operative to:

access a repository of credential keys using an identifier of a software or hardware resource to obtain the predefined credential value string and the predefined credential order string for the identified software or hardware resource.

7. The electronic device of claim 1, wherein the at least one processor is further operative to:

display a plurality of indicia on a display device, each of the indicia indicating a location where the user can enter one of the credential values;

generate the credential value string to indicate credential values entered by the user at the locations indicated by the plurality of indicia; and generate the input order string to indicate an order in which individual ones of the credential values were entered at the locations indicated by the plurality of indicia were selected by the user.

8. The electronic device of claim 1, wherein the at least one processor is further operative to:

display a plurality of values at spaced apart locations on a display device;

assemble a sequence of values which is displayed on the display device responsive to user commands moving individual ones of the plurality of values to locations in the assembled sequence of values;

generate the credential value string to indicate the assembled sequence of values responsive to a user entry indicating completion of assembly of the credential value string; and generate the input order string to indicate an order in which individual ones of the plurality of values were moved by the user to the locations in the sequence of values.

9. The electronic device of claim 8, wherein display device comprises a touch sensitive display, and the at least one processor is further operative to:

assemble the sequence of values which is displayed on the display device responsive to sensing the user drag individual ones of the plurality of values to locations in the assembled sequence of values.

10. The electronic device of claim 1, wherein the at least one processor is further operative to:

display an n by m grid of indicia on a display device which are separately selectable by the user, wherein n and m are positive plural integers;

generate the credential value string to indicate which of the indicia of the grid have been selected by the user; and generate the input order string to indicate an order in which individual ones of the indicia of the grid were selected by the user.

11. The electronic device of claim 10, wherein the at least one processor is further operative to generate the credential value string to further indicate which of the indicia of the grid have not been selected by the user.

12. The electronic device of claim 10, wherein the at least one processor is further operative to generate of the credential value string by setting a defined binary value for locations in the credential value string corresponding to individual ones of the indicia of the grid that are selected by the user.

13. The electronic device of claim 10, wherein the at least one processor is further operative to generate of the credential value string by:

setting each location in the credential value string to a defined binary value;

toggle a binary value at a location in the credential value string from a current binary value to an opposite new binary value responsive to selection of one of the indicia of the grid by the user corresponding to the location in the credential value string.

14. The electronic device of claim 10, wherein the at least one processor is further operative to:

change color, shading, or shape of individual ones of the grid of indicia displayed on the display device responsive to user selection of the individual ones of the indicia of the grid.

15. The electronic device of claim 10, wherein the at least one processor is further operative to:

generate the input order string to indicate an order in which individual ones of the indicia of the grid were selected by the user dragging a finger across the individual ones of the indicia displayed on a touch sensitive display device or an order in which individual ones of the indicia of the grid were selected by the user dragging a cursor across the individual ones of the indicia while a mouse selection button was actuated.

16. An electronic device comprising:

a display;

at least one processor coupled to the display; and at least one memory storing instructions executable by the at least one processor to display on the display device a plurality of spatially separated input locations each configured to receive a credential value;

display on the display device a plurality of credential values each of which can be user-selected into each of the displayed spatially separated input locations on the display;

obtain a credential value string indicating a sequence of the credential values entered by a user through a user interface as a part of a credential key defining a password and using the displayed credential values, obtain an input order string indicating an order in which individual ones of the sequence of credential values were separately user-selected into the displayed spatially separated input locations as another part of the credential key by:

storing for each entered credential value the location of the entered credential value among the plurality of spatially separated input locations; and storing when the each credential value was entered through the user interface relative to the other credential values, and validate the credential key based on the obtained credential value string and based on the input order string which indicates the order in which the sequence of credential values were user-selected into the displayed input locations wherein the electronic device includes a wired or wireless network interface circuit, a user interface, and at least one memory circuit.

17. The electronic device of claim 16, wherein the at least one processor is further operative to:

display an n by m grid of indicia on a display device which are separately selectable by the user, wherein n and m are positive plural integers;

generate the credential value string to indicate which of the indicia of the grid have been selected by the user; and generate the input order string to indicate an order in which individual ones of the indicia of the grid were selected by the user.

18. An electronic device comprising:

a display;

at least one processor coupled to the display; and at least one memory storing instructions executable by the at least one processor to display on the display device a plurality of spatially separated input locations each configured to receive a credential value;

display on the display device a plurality of credential values each of which can be user-selected into each of the displayed spatially separated input locations on the display;

obtain a credential value string indicating a sequence of credential values entered by a user through a user interface as a part of a credential key defining a password and by drag and dropping the displayed credential values into the displayed input locations, obtain an input order string indicating an order in which individual ones of the sequence of credential values were separately drag and dropped into the displayed spatially separated input locations as another part of the credential key by storing for each drag and dropped credential value the location of the drag and dropped credential value among the plurality of spatially separated input locations; and storing when the each drag and dropped credential value was entered through the user interface relative to the other credential values, and validate the credential key based on the credential value string and based on the input order string wherein the electronic device includes a network node, the network node having a wired or wireless network interface circuit, and at least one memory circuit.

19. The electronic device of claim 18, wherein the at least one processor is further operative to:

display an n by m grid of indicia on a display device which are separately selectable by the user, wherein n and m are positive plural integers;

generate the credential value string to indicate which of the indicia of the grid have been selected by the user; and generate the input order string to indicate an order in which individual ones of the indicia of the grid were selected by the user.

20. The electronic device of claim 18, wherein the at least one processor is further operative to generate of the credential value string by:

setting each location in the credential value string to a defined binary value;

toggle a binary value at a location in the credential value string from a current binary value to an opposite new binary value responsive to selection of one of the indicia of the grid by the user corresponding to the location in the credential value string.

\* \* \* \* \*